US011862877B2

(12) United States Patent
Kosaka et al.

(10) Patent No.: US 11,862,877 B2
(45) Date of Patent: Jan. 2, 2024

(54) ANTENNA, BOARD AND COMMUNICATION DEVICE

(71) Applicant: JAPAN AVIATION ELECTRONICS INDUSTRY, LIMITED, Tokyo (JP)

(72) Inventors: Keishi Kosaka, Tokyo (JP); Hiroshi Toyao, Tokyo (JP); Eiji Hankui, Tokyo (JP); Yasuhiko Matsunaga, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 398 days.

(21) Appl. No.: 17/298,233

(22) PCT Filed: Oct. 29, 2019

(86) PCT No.: PCT/JP2019/042307
§ 371 (c)(1),
(2) Date: May 28, 2021

(87) PCT Pub. No.: WO2020/137137
PCT Pub. Date: Jul. 2, 2020

(65) Prior Publication Data

US 2022/0123474 A1 Apr. 21, 2022

(30) Foreign Application Priority Data

Dec. 27, 2018 (JP) ................................ 2018-243860

(51) Int. Cl.
*H01Q 21/24* (2006.01)
*H01Q 9/04* (2006.01)
(Continued)

(52) U.S. Cl.
CPC ............. *H01Q 9/0485* (2013.01); *H01Q 1/46* (2013.01); *H01Q 13/106* (2013.01); *H01Q 21/24* (2013.01); *H01Q 21/29* (2013.01)

(58) Field of Classification Search
CPC ...... H01Q 9/0485; H01Q 1/46; H01Q 13/106; H01Q 21/24; H01Q 21/29
See application file for complete search history.

(56) References Cited

U.S. PATENT DOCUMENTS 7,612,725 B2 11/2009 Hill et al.
7,843,396 B2 11/2010 Hill et al.
(Continued)

FOREIGN PATENT DOCUMENTS

CN 105680175 A 6/2016
KR 20120045057 A 5/2012
(Continued)

OTHER PUBLICATIONS

European Office Action dated Dec. 16, 2022, issued in counterpart European Application No. 19903373.9.
(Continued)

*Primary Examiner* — Graham P Smith
(74) *Attorney, Agent, or Firm* — Holtz, Holtz & Volek PC

(57) ABSTRACT

An antenna includes antenna elements provided one by one on the respective sides of a substantially rectangular conductor plate. Each of the antenna elements includes a feeding wire and a split ring conductor having a shape in which a ring is partially cut by a split part. The feeding wire is electrically connected to the split ring conductor and extends in a direction across a region formed inside the split ring conductor. Two antenna elements provided on two arbitrary sides facing each other of the conductor plate among the four antenna elements are each supplied with power through the feeding wire included in each antenna element so as to have substantially the same direction of an electric field in a polarization direction.

7 Claims, 26 Drawing Sheets

A1

(51) Int. Cl.

| | |
|---|---|
| ***H01Q 1/46*** | (2006.01) |
| ***H01Q 13/10*** | (2006.01) |
| ***H01Q 21/29*** | (2006.01) |

(56) References Cited

U.S. PATENT DOCUMENTS

| | | | |
|---|---|---|---|
| 7,924,231 | B2 | 4/2011 | Hill et al. |
| 8,169,374 | B2 | 5/2012 | Hill et al. |
| 8,907,852 | B2 | 12/2014 | Hill et al. |
| 9,356,355 | B2 | 5/2016 | Hill et al. |
| 9,461,368 | B2 | 10/2016 | Azulay et al. |
| 9,496,616 | B2 | 11/2016 | Toyao |
| 9,882,269 | B2 | 1/2018 | Hill et al. |
| 2010/0053022 | A1 | 3/2010 | Mak et al. |
| 2014/0203993 | A1 | 7/2014 | Toyao |
| 2015/0288071 | A1 | 10/2015 | Toyao |
| 2016/0294048 | A1 | 10/2016 | Xu et al. |
| 2018/0212308 | A1 | 7/2018 | Vandenbosch et al. |

FOREIGN PATENT DOCUMENTS

| | | | |
|---|---|---|---|
| TW | 201004034 | A | 1/2010 |
| WO | 2007126831 | A2 | 11/2007 |
| WO | 2013027824 | A1 | 2/2013 |
| WO | 2014073703 | A1 | 5/2014 |

OTHER PUBLICATIONS

European Office Action dated Jul. 1, 2022, issued in counterpart European Application No. 19903373.9.

Korean Office Action (and English language translation thereof) dated Jun. 27, 2022, issued in counterpart Korean Application No. 10-2021-7016561.

Bertin, et al., "Switched Beam Antenna Employing Metamaterial-Inspired Radiators", Aug. 1, 2021.

Extended European Search Report (EESR) dated Jan. 20, 2022, issued in counterpart European Application No. 19903373.9.

Nurul, et al., "A Dual-band MIMO Antenna for Bluetooth/ WiMax/L TE Applications", Nov. 28, 2018, XP033636014.

Sarkar, et al., "Four-element quad-band multiple-input-multiple-output antenna employing split-ring resonator and inter-digital capacitor", IET Microwaves, Antennas & Propagation, The Institution of Engineering and Technology, vol. 9, No. 13, Oct. 1, 2015 (Oct. 1, 2015).

International Search Report (ISR) (and English translation thereof) dated Jan. 21, 2020 issued in International Application No. PCT/JP2019/042307.

Written Opinion dated Jan. 21, 2020 issued in International Application No. PCT/JP2019/042307.

Arora, et al., "Multiple Split Ring Resonator Inspired Dual Band Microstrip Patch Antenna Array", Microwave Review, Jun. 7-14, 2019.

Taiwanese Office Action (and an English language translation thereof) dated May 31, 2023, issued in counterpart Taiwanese Application No. 108146083.

ANTENNA, BOARD AND COMMUNICATION DEVICE

TECHNICAL FIELD

This invention relates to an antenna, a board and a communication device, for example.

BACKGROUND ART

An antenna with a split-ring resonator is known as a compact antenna used in a wireless communication device. For example, Patent Document 1 discloses a rectangular conductive board comprising a split-ring resonator.

PRIOR ART DOCUMENTS

Patent Document(s)

Patent Document 1: U.S. Pat. No. 9,496,616 B

SUMMARY OF INVENTION

Technical Problem

The inventors of the present patent have found a problem that if an additional split-ring resonator is merely arranged, in order to dual-polarize the antenna of Patent Document 1, on a side of the conductive board of Patent Document 1 adjacent to a side on which the split-ring resonator is arranged, the orthogonality of radiation patterns between two polarized waves cannot be ensured.

Solution to Problem

For example, an antenna according to an aspect of the present disclosure may be an antenna comprising antenna elements provided on sides of a nearly rectangular shaped conductive board, respectively, wherein: each of the antenna elements comprises a feeding wire and a split-ring conductor of a shape which is a ring but is partially cut by a split portion; the feeding wire is electrically connected with the split-ring conductor and extends in a direction which traverses a region formed inside the split-ring conductor; and among four of the antenna elements, two of the antenna elements which are arranged on any two of the sides of the conductive board opposite to each other are fed via the feeding wires respectively provided thereto so that orientations of electric fields in polarization directions thereof are substantially same as each other. For example, a board according to an aspect of the present disclosure may be a board comprising: a nearly rectangular shaped conductive board; terminals corresponding to ground terminals of antenna elements so that the antenna elements are attached to sides of the conductive board, respectively; and terminals corresponding to terminals of feeding wires so that the antenna elements are fed via the feeding wires, respectively, in such a manner that orientations of electric fields in polarization directions of the antenna elements arranged on any two of the sides of the conductive board opposite to each other are substantially same as each other, wherein: each of the antenna elements comprises the feeding wire, the ground terminal separated from the conductive board and a split-ring conductor of a shape which is a ring but is partially cut by a split portion; and the feeding wire is electrically connected with the split-ring conductor and extends in a direction which traverses a region formed inside the split-ring conductor. For example, a communication device according to an aspect of the present disclosure may be a communication device comprising an antenna according to an aspect of the present disclosure.

Advantageous Effects of Invention

For example, according to various aspects of the present disclosure, a compact dual-polarization antenna with a split-ring resonator, a board for the antenna and a communication device can be provided.

DESCRIPTION OF EMBODIMENTS

All aspects according to the present disclosure are merely examples, and they are neither intended to exclude the other examples from the present disclosure nor intended to limit technical features of the invention described in Claims.

The description about combinations of the aspects according to the present disclosure may be partially omitted. Such omissions are intended to simplify the description, and they are neither intended to exclude them from the present disclosure nor intended to limit the technical scope of the invention described in Claims. All combinations of the aspects according to the present disclosure are included in the present disclosure either explicitly, implicitly or inherently, regardless of whether the omission is made or not. Thus, all combinations of the aspects according to the present disclosure can be directly and clearly conceived from the present disclosure, regardless of whether the omission is made or not.

Figure 1:
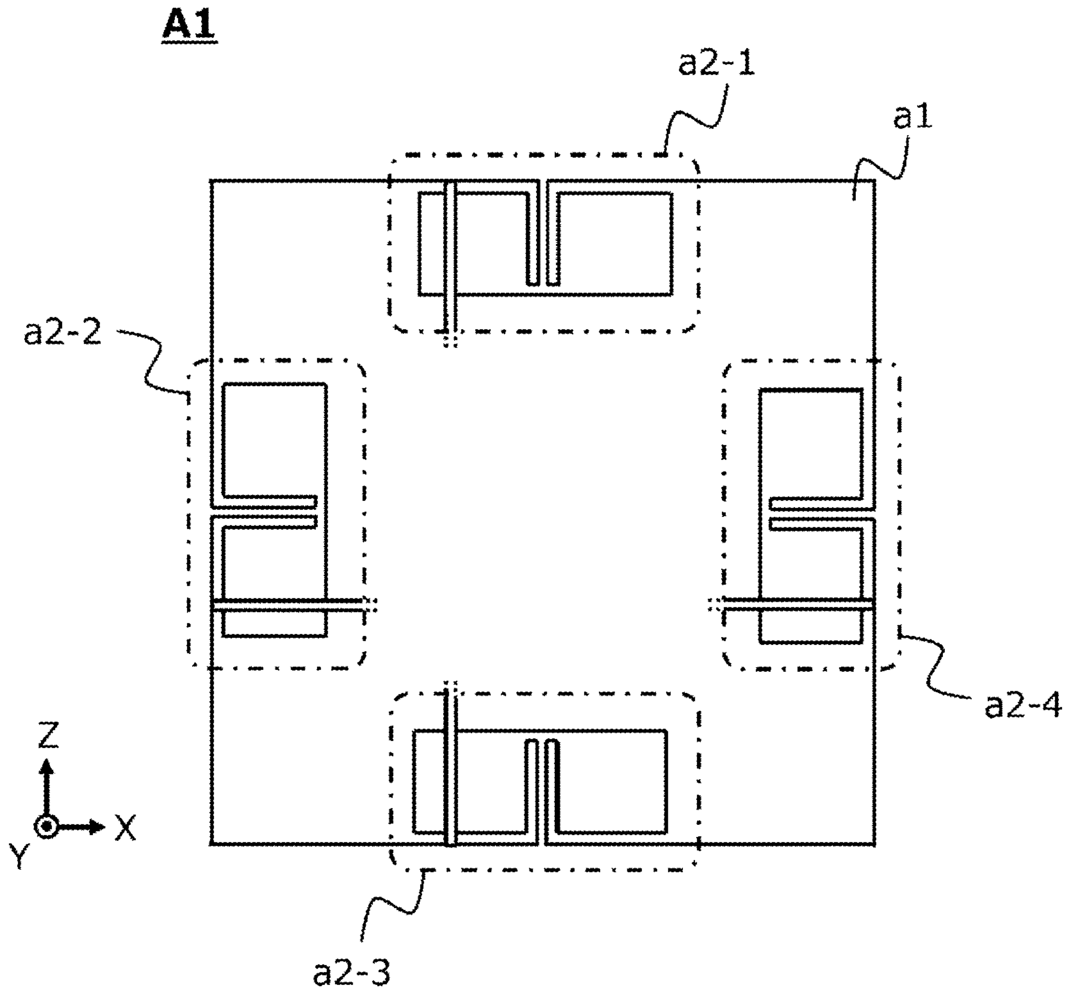
FIG. 1 is an example of an antenna according to an aspect of the present disclosure.
Figure 2:
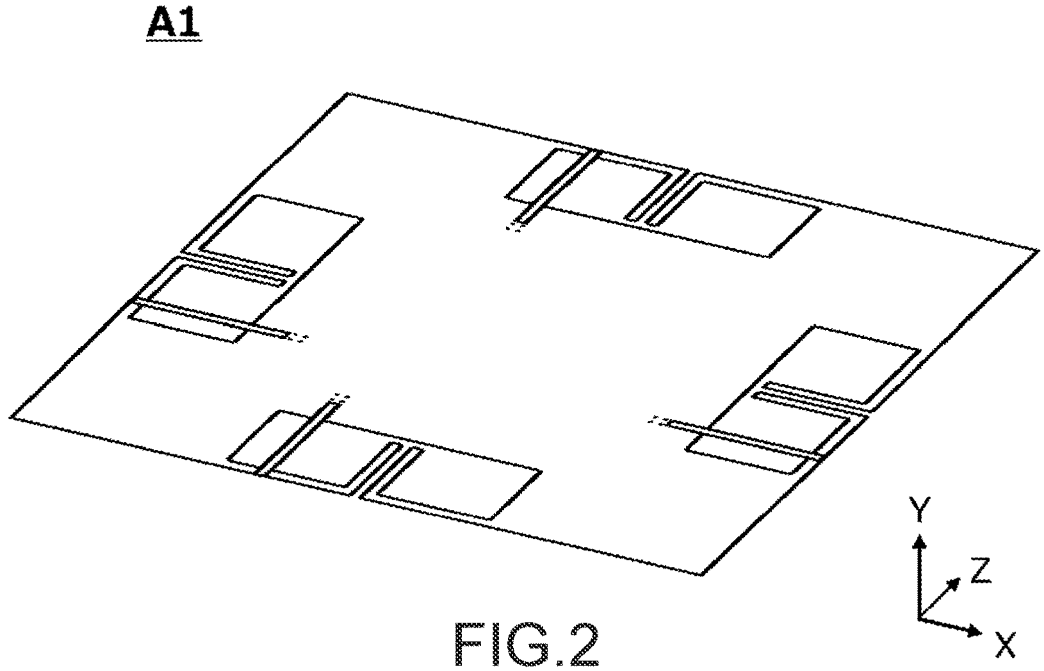
FIG. 2 is an example of an antenna according to an aspect of the present disclosure.
Figure 3:
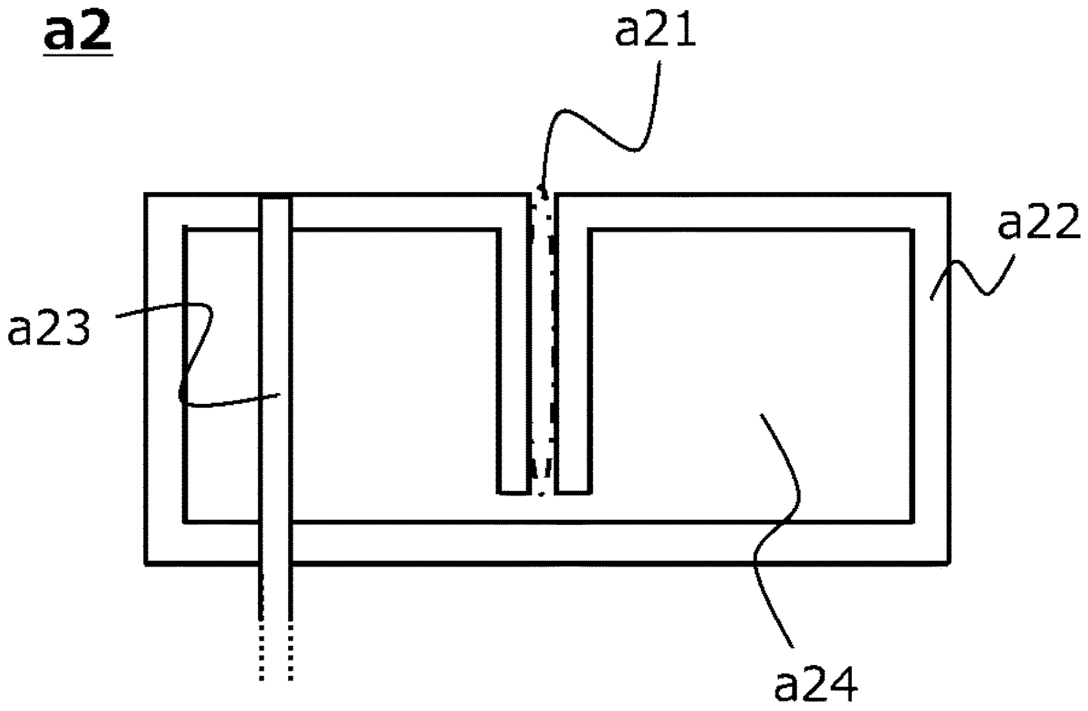
FIG. 3 is an example of an antenna element according to an aspect of the present disclosure.
Figure 4:
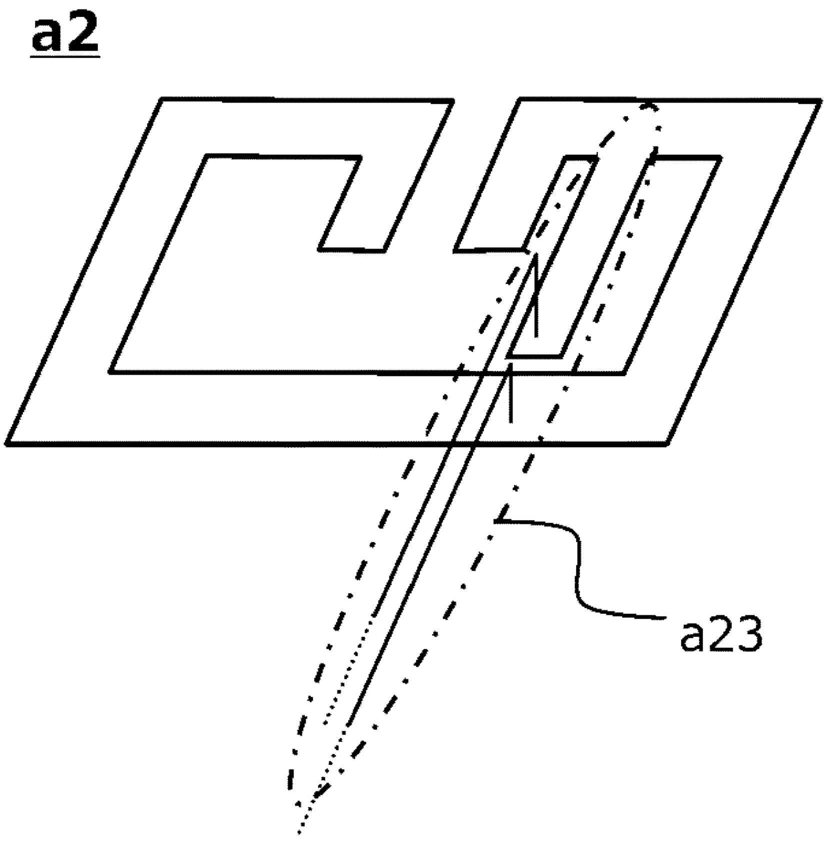
FIG. 4 is an example of an antenna element according to an aspect of the present disclosure.
Figure 5:
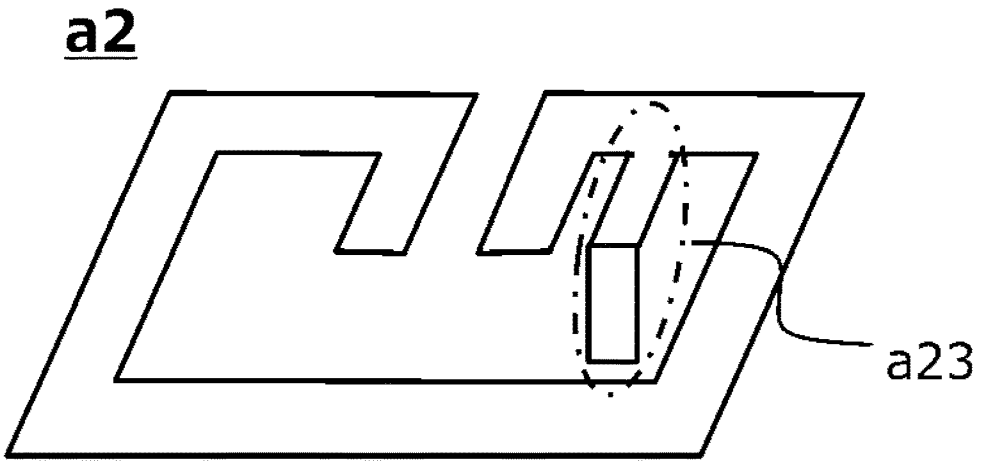
FIG. 5 is an example of an antenna element according to an aspect of the present disclosure.
Figure 6:
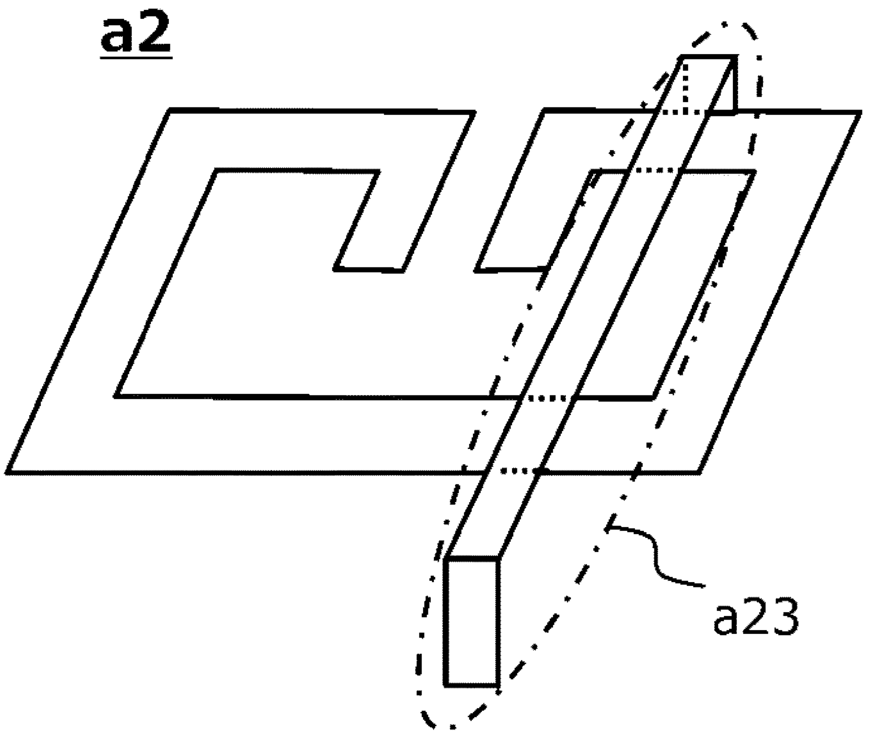
FIG. 6 is an example of an antenna element according to an aspect of the present disclosure.
Figure 7:
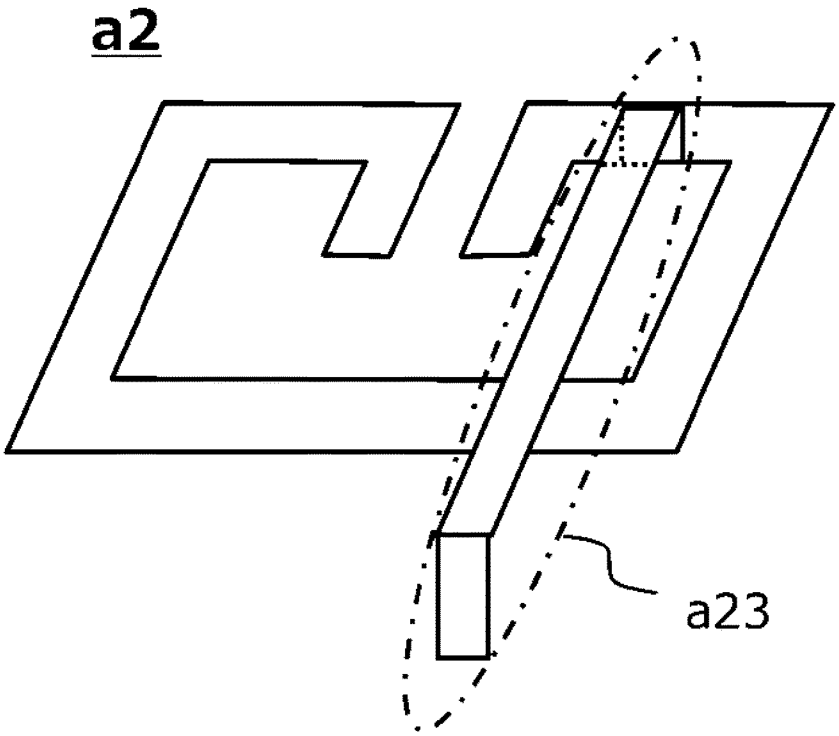
FIG. 7 is an example of an antenna element according to an aspect of the present disclosure.
Figure 8:
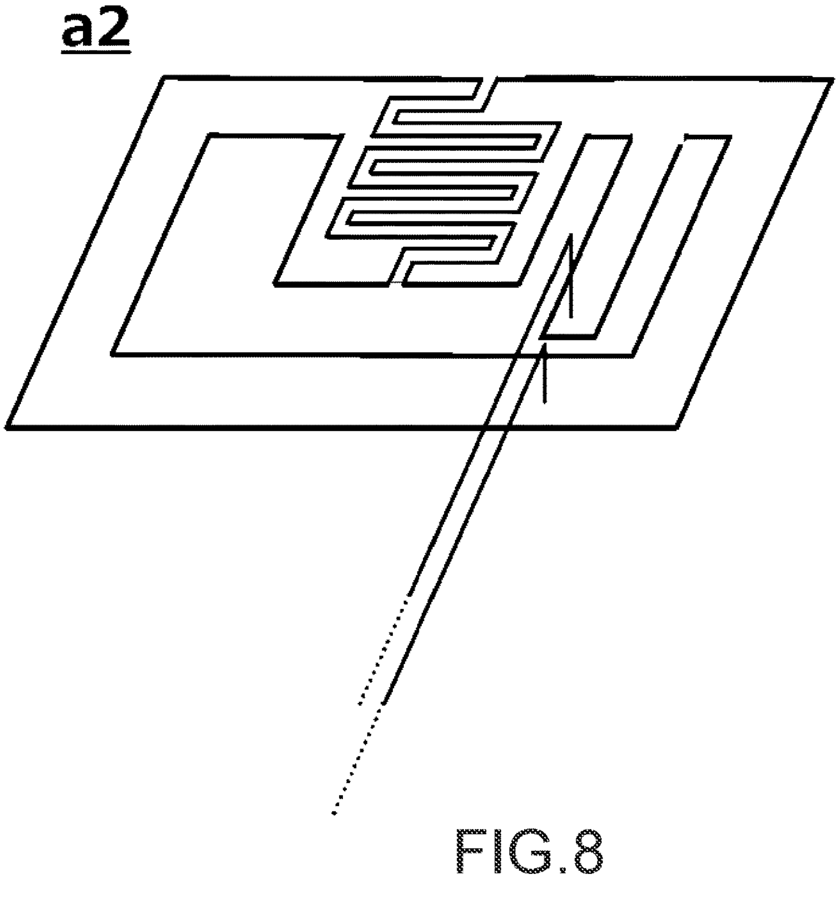
FIG. 8 is an example of an antenna element according to an aspect of the present disclosure.
Figure 9:
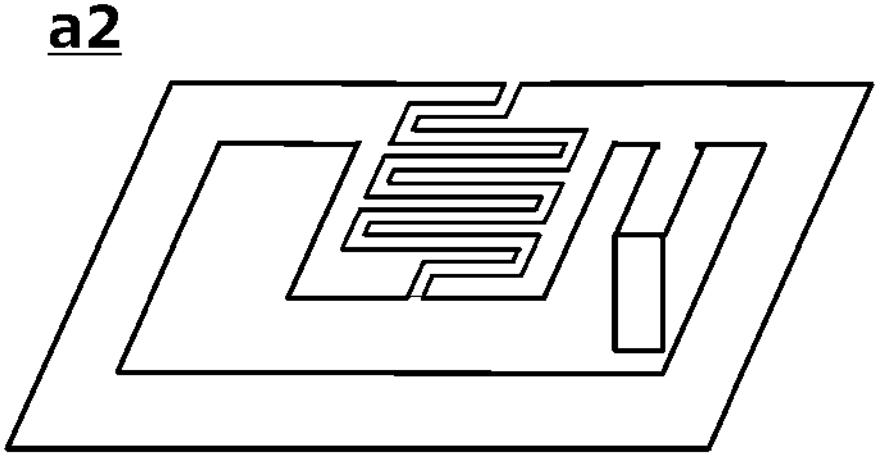
FIG. 9 is an example of an antenna element according to an aspect of the present disclosure.
Figure 10:
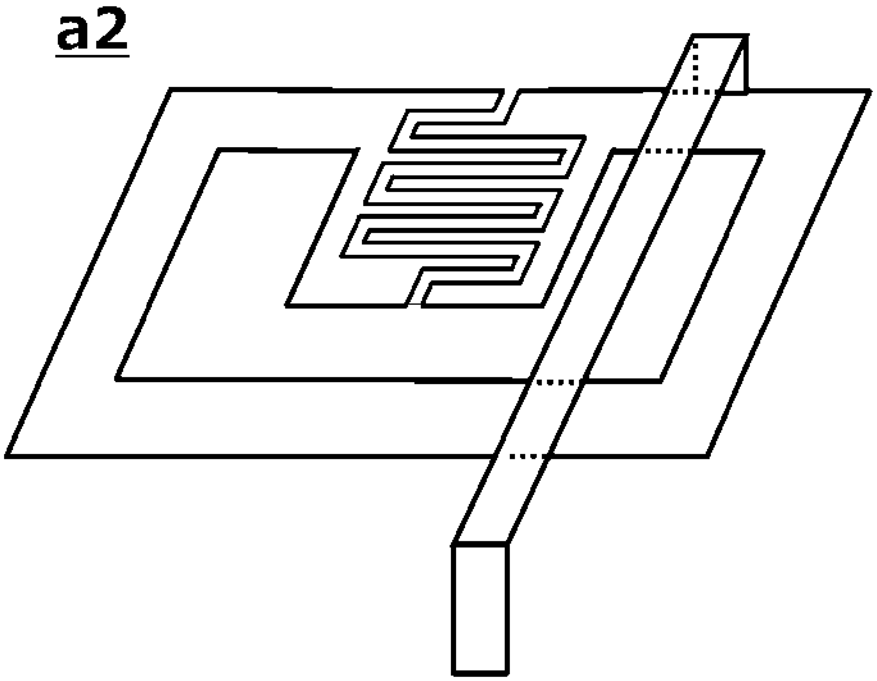
FIG. 10 is an example of an antenna element according to an aspect of the present disclosure.
Figure 11:
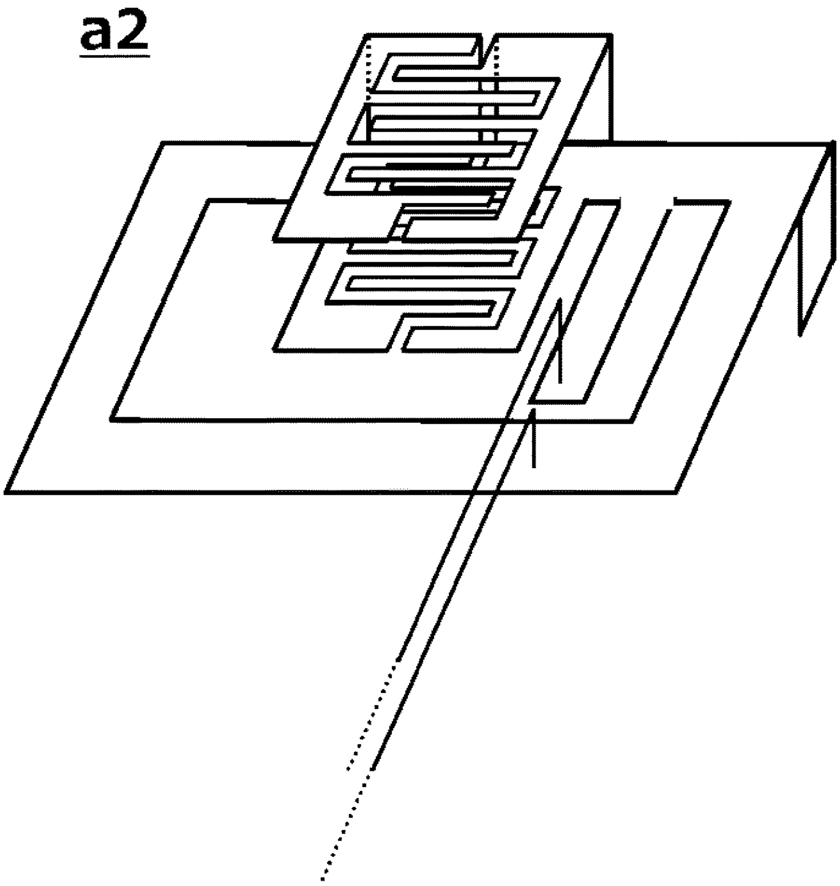
FIG. 11 is an example of an antenna element according to an aspect of the present disclosure.
Figure 12:
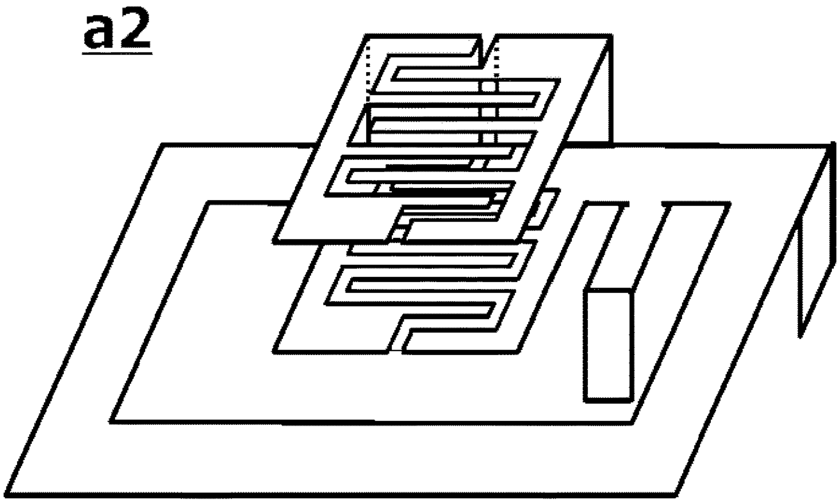
FIG. 12 is an example of an antenna element according to an aspect of the present disclosure.
Figure 13:
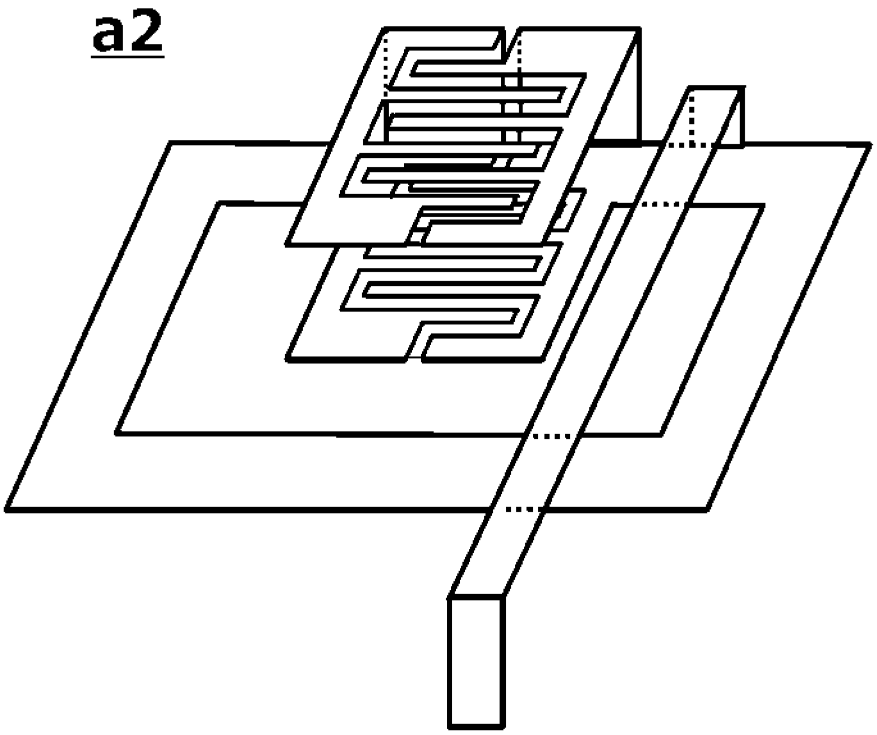
FIG. 13 is an example of an antenna element according to an aspect of the present disclosure.
Figure 14:
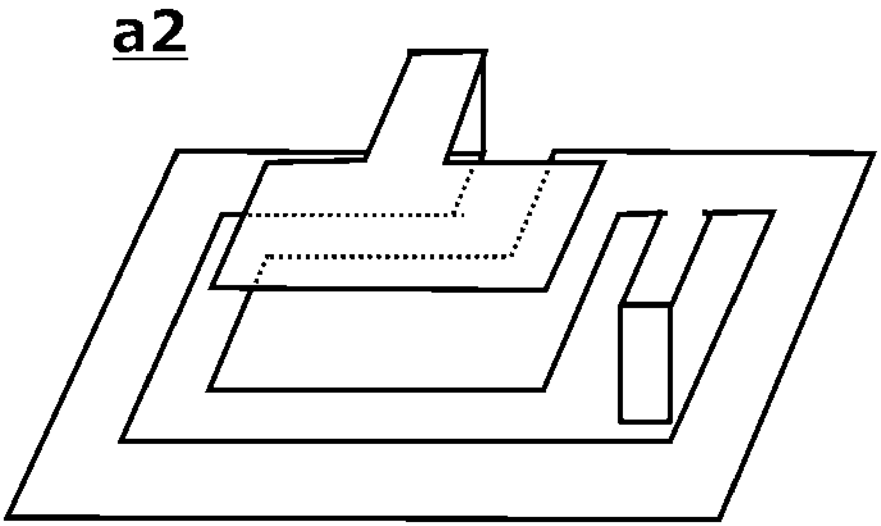
FIG. 14 is an example of an antenna element according to an aspect of the present disclosure.

For example, as shown in FIGS. 1 and 2, an antenna according to an aspect of the present disclosure may be an antenna A1 comprising antenna elements a2 (a2-1, a2-2, a2-3 and a2-4) provided on sides of a nearly rectangular shaped conductive board a1, respectively, wherein: each of the antenna elements a2 comprises a feeding wire a23 (a23-1, a23-2, a23-3 or a23-4) and a split-ring conductor a22 (a22-1, a22-2, a22-3 or a22-4) of a shape which is a ring but is partially cut by a split portion a21 (a21-1, a21-2, a21-3 or a21-4); the feeding wire a23 is electrically connected with the split-ring conductor a22 and extends in a direction which traverses a region a24 formed inside the split-ring conductor a22; and among four of the antenna elements a2, two of the antenna elements a2, i.e. (a2-1 and a2-3) or (a2-2 and a2-4), which are arranged on any two of the sides of the conductive board a1 opposite to each other are fed via the feeding wires a23 respectively provided thereto so that orientations of electric fields in polarization directions thereof are substantially same as each other.

For example, the conductive board a1 may be provided on a board B1.

For example, the antenna element a2 may be that of FIGS. 3 to 14 or may be their modification. For example, although FIGS. 1 and 2 show an example of the antenna A1 having sides each of which is provided with the antenna element a2 of FIG. 3 or its modification, each of the antenna elements a2 (a2-1, a2-2, a2-3 and a2-4) of the antenna A1 may be any one of the antenna elements a2 of FIGS. 4 to 14 and their modifications.

For example, the split portion a21 may be filled with nothing or may be filled with resin, etc. For example, the split portion a21 may have any shape and may have a shape such as a straight line, a curved line, or a zigzag line. For example, the split portion a21 may have a meander shape. The wording of the meander shape includes concept which is specified by the wordings such as a zigzag shape, a comb tooth shape, and a shape based on an interdigital structure. For example, the meander shape is formed of a combination of a straight line, a curved line, a zigzag line, etc.

For example, the split-ring conductor a22 may be formed of a metal plate. For example, the split-ring conductor a22 may have any shape, may have a shape based on a C-like shape along a rectangular ring, or may have a shape based on the other various rings such as a circular ring, an elliptical ring and a track ring. For example, the region a24 formed inside the split-ring conductor a22 may have any shape, may have a polygonal shape such as a square or a rectangle, or may have a shape such as a circle or an ellipse. For example, the split-ring conductor a22 may comprise an auxiliary conductor provided on parts thereof which sandwich the split portion a21 therebetween. The auxiliary conductor may be provided in a layer same as or different from that of the split-ring conductor a22.

The phrase of "the feeding wire a23 is electrically connected with the split-ring conductor a22" includes both concepts of electrical connection by direct connection of a conductor and electrical connection for wireless feeding such as EM feeding. For example, the feeding wire a23 may be connected to any part of the split-ring conductor a22, and impedance of an RF circuit and impedance of the antenna element a2 can be adjusted by adjusting the connected position. For example, the feeding wire a23 may be provided in a layer different from that of the split-ring conductor a22 and may be connected to the split-ring conductor a22 through a via, for example. For example, the feeding wire a23 may be provided in a layer same as a layer in which the split-ring conductor a22 exists, may extend in the region a24 and may extend along a clearance formed in the split-ring conductor a22 or in the conductive board a1. For example, the feeding wire a23 may be formed of a wire such as a transmission line and may be formed of a metal plate. For example, the split-ring conductor a22 and the metal plate part of the feeding wire a23 may be formed by cutting out them from one conductive board by a laser, etc.

Figure 15:
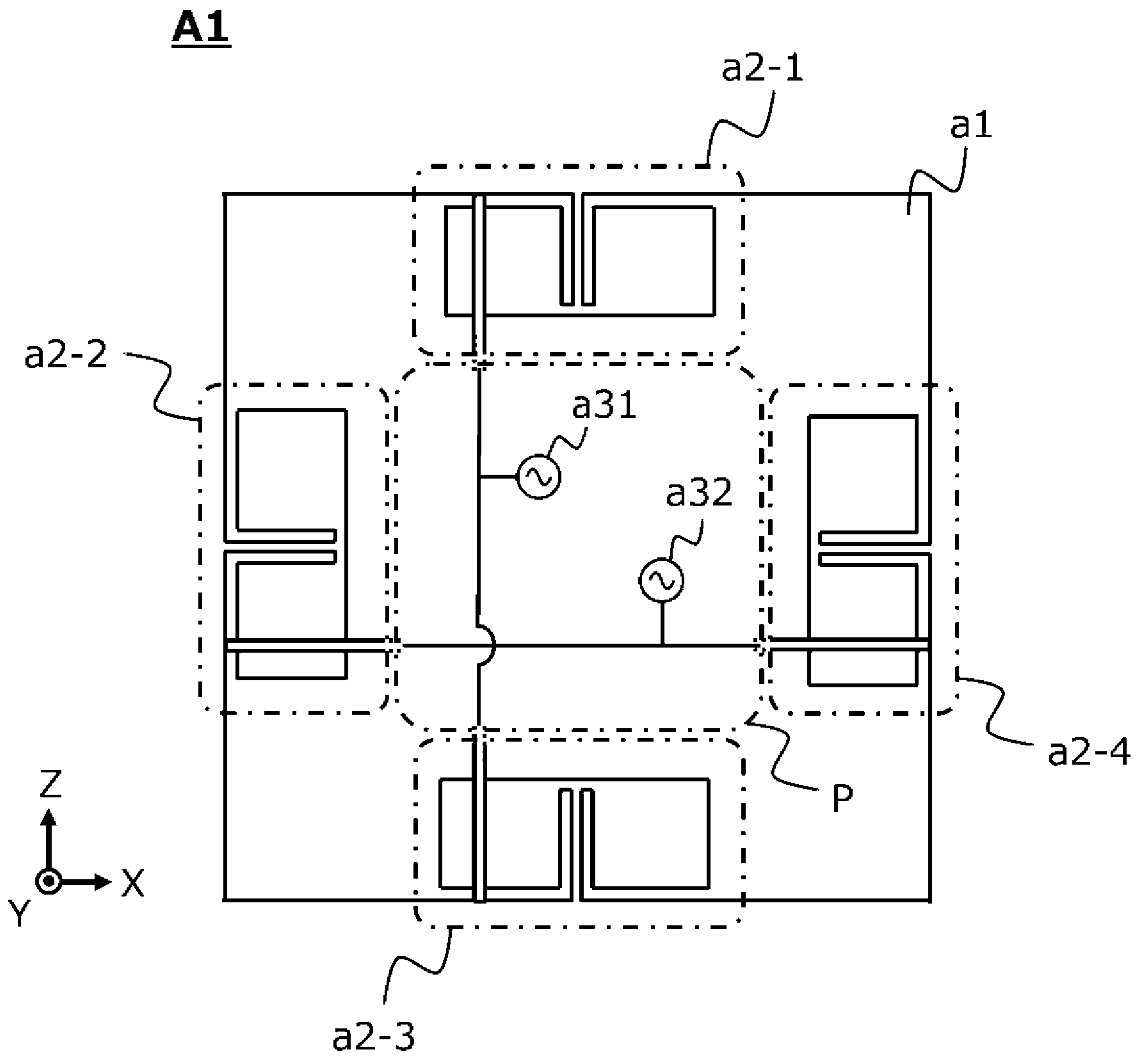
FIG. 15 is an example of a feeding circuit diagram of an antenna according to an aspect of the present disclosure.
Figure 16:
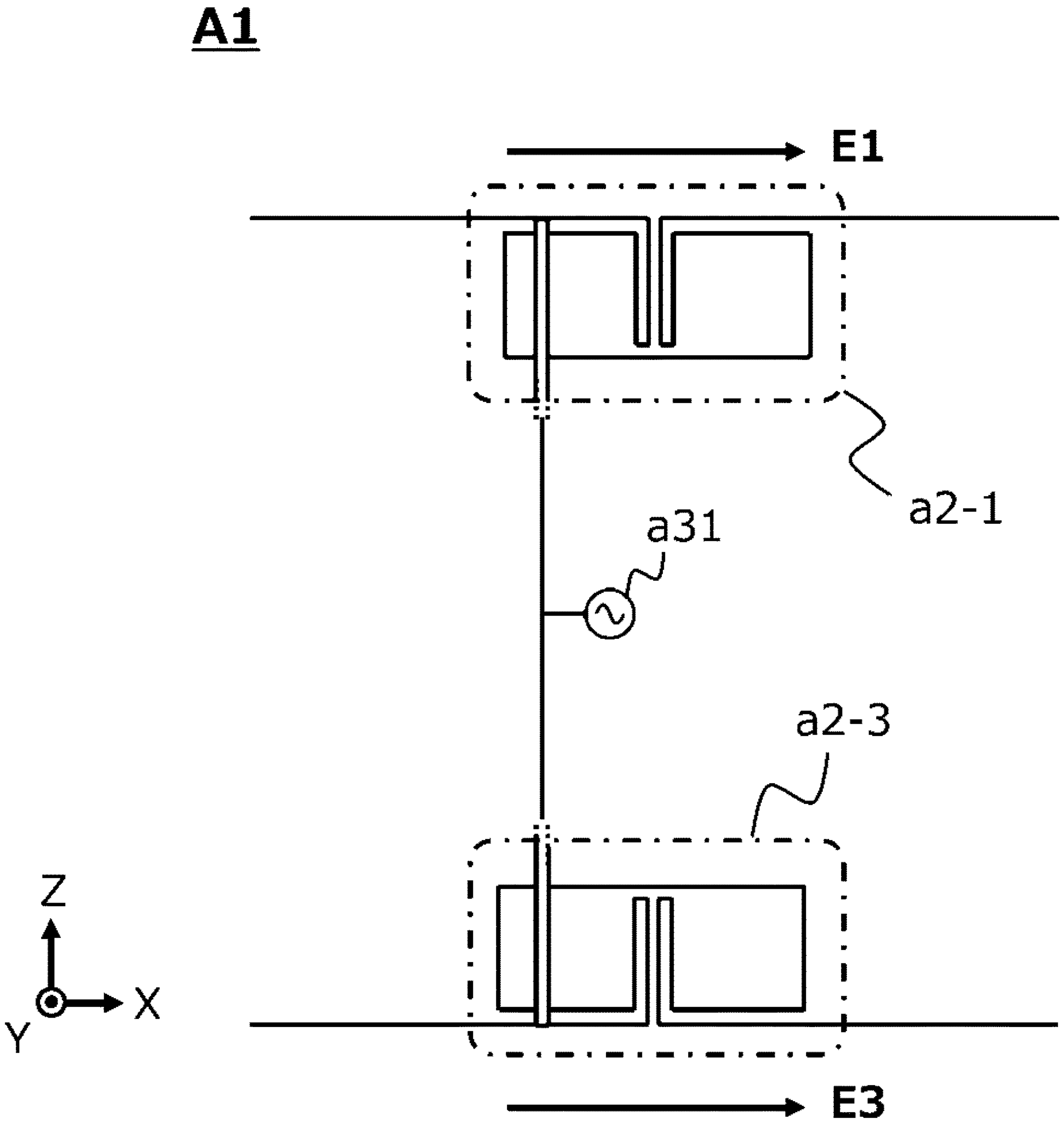
FIG. 16 is an example of a feeding circuit diagram of an antenna according to an aspect of the present disclosure.
Figure 17:
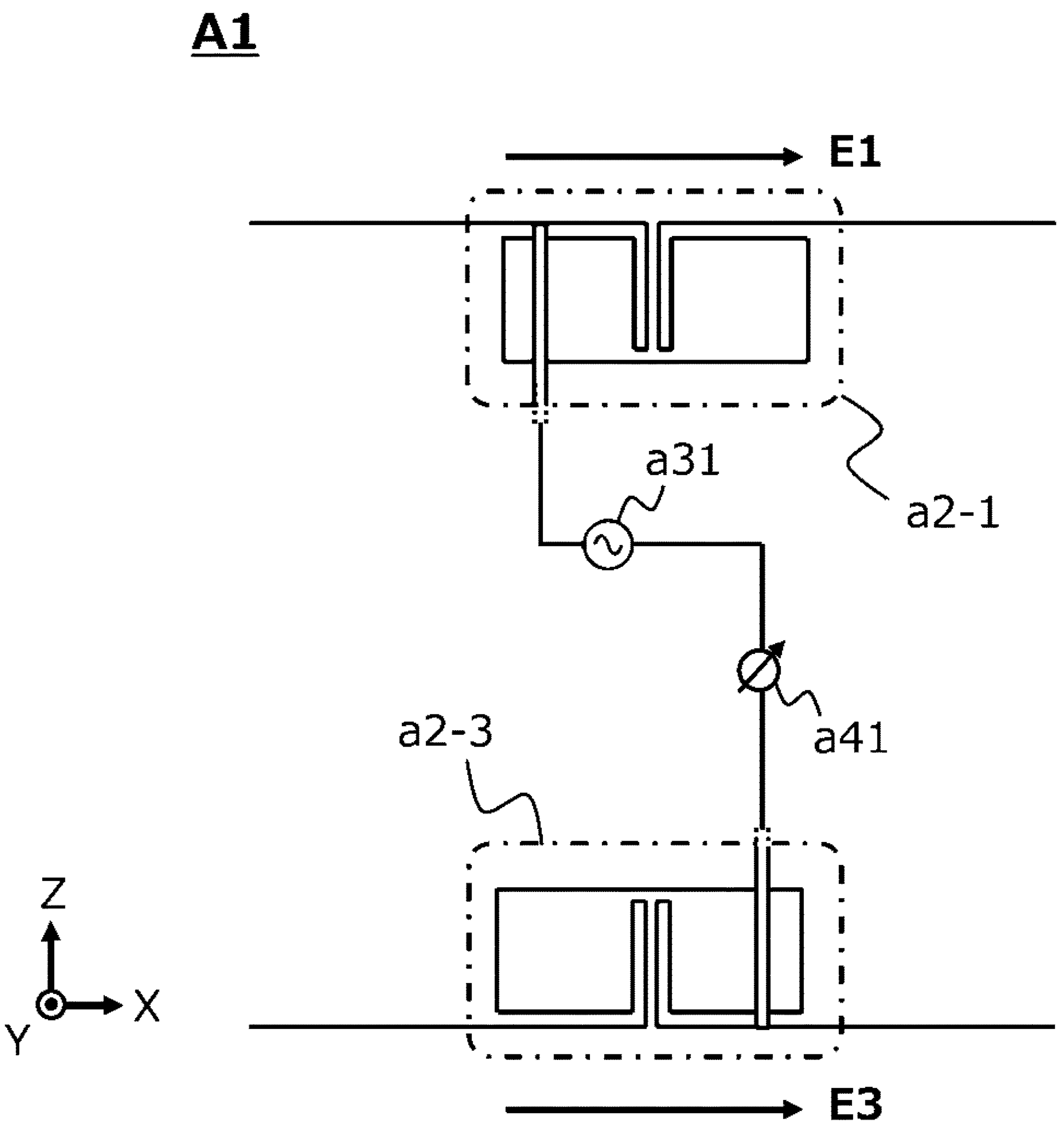
FIG. 17 is an example of a feeding circuit diagram of an antenna according to an aspect of the present disclosure.

For example, the feeding to the antenna elements a2 (a2-1, a2-2, a2-3 and a2-4) may be implemented in a configuration such as a circuit diagram P of FIG. 15. For example, in FIG. 15, the antenna element a2-1 and the antenna element a2-3 are fed by a feeding point a31, and the antenna element a2-2 and the antenna element a2-4 are fed by a feeding point a32. The feature of "the antenna element a2-1 and the antenna element a2-3 are fed via the aforementioned feeding wires a23 provided thereto so that orientations of electric fields in polarization directions thereof are substantially same as each other" may be implemented in configurations such as those of FIGS. 16 and 17 and their modifications, for example. Similar implementation can be made for the antenna element a2-2 and the antenna element a2-4. For example, the antenna element a2-1 and the antenna element a2-3 of FIG. 16 are simply fed by the feeding point a31 so that an orientation E1 of an electric field in polarization direction of the antenna element a2-1 is substantially same as an orientation E3 of an electric field in polarization direction of the antenna element a2-3. Moreover, for example, a feeding wire from the feeding point a31 to the antenna element a2-1 and another feeding wire from the feeding point a31 to the antenna element a2-3 are arranged so that their electrical lengths are substantially equal to each other. For example, in FIG. 17, the antenna element a2-1 is simply fed by the feeding point a31, while the antenna element a2-3 is fed by a feeding point a3 via a phase shifter a41, for example, a 180 degrees phase shifter. This configuration reduces affection depending on the connected position between the split-ring conductor a22 and the feeding wire a23 so that E1 and E3 are substantially same as each other.

Figure 18:
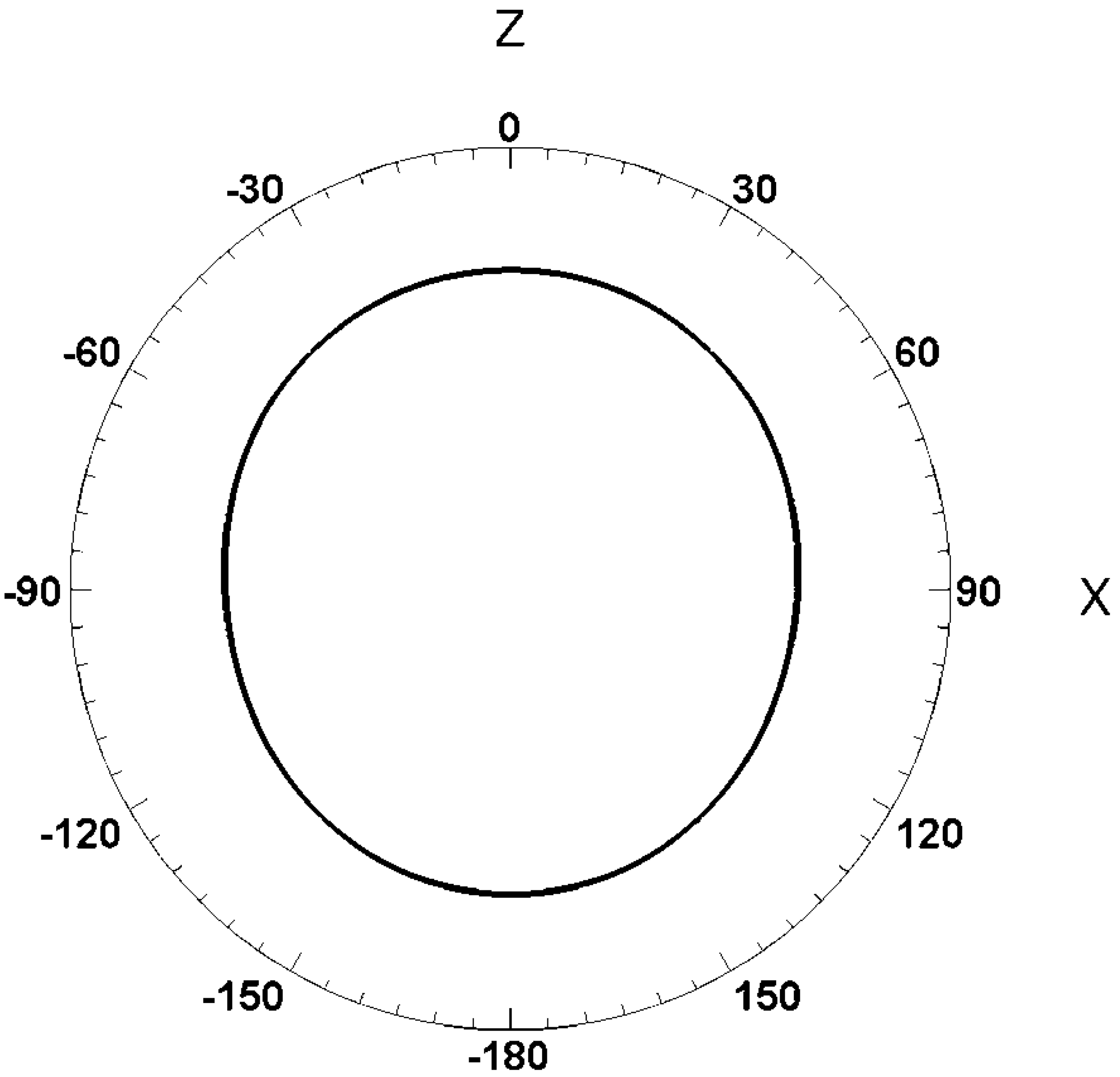
FIG. 18 is an example of antenna characteristics.
Figure 19:
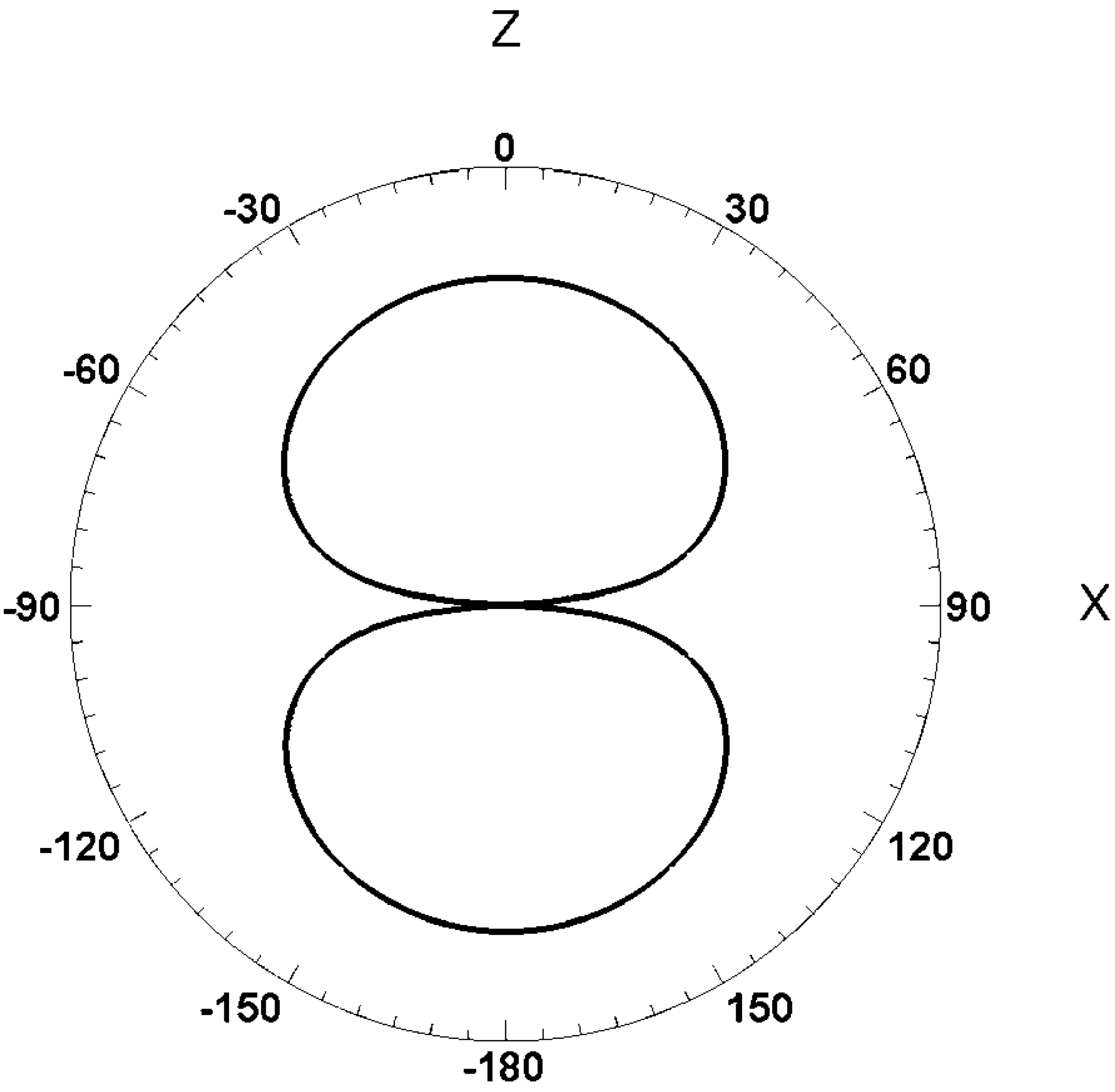
FIG. 19 is an example of antenna characteristics.
Figure 20:
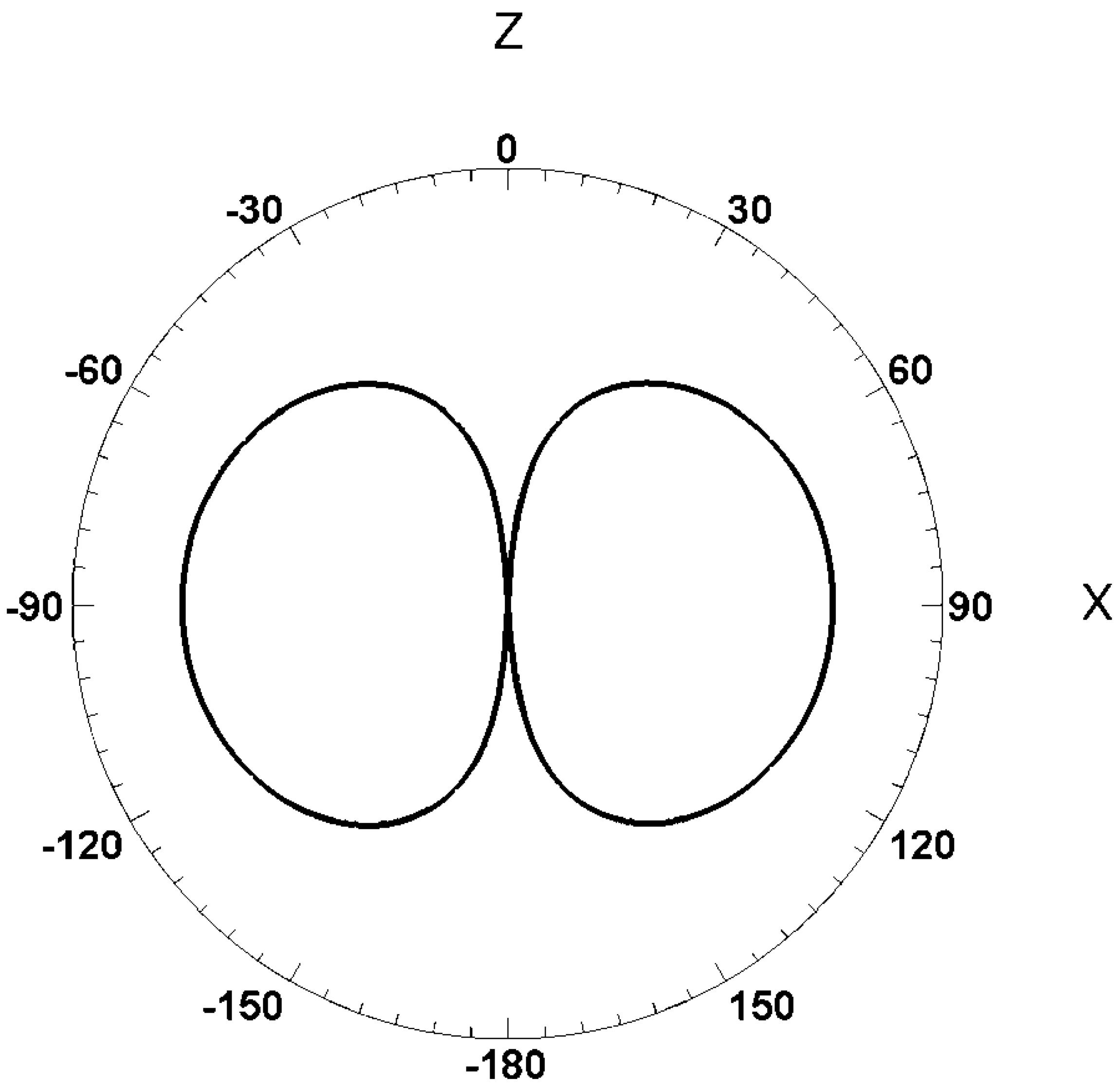
FIG. 20 is an example of antenna characteristics.

For example, in an instance where only one of the sides of the conductive board a1 of a rectangular shape is provided with one of the antenna elements a2 (a2-1), a radiation pattern of polarized wave corresponding to this antenna element a2 (a2-1) can be illustrated as FIG. 18. Therefore, for example, when dual-polarization is tried by providing additional one of the antenna elements a2 (a2-2 or a2-4) on another side adjacent to the side on which this antenna element a2 (a2-1) is provided, the orthogonality of radiation patterns of two polarized waves might be low. In contrast, according to the antenna A1 of an aspect of the present disclosure, radiation patterns of polarized waves corresponding to the antenna element a2-1 and the antenna element a2-3 can be illustrated as FIG. 19, for example, and radiation patterns of polarized waves corresponding to the antenna element a2-2 and the antenna element a2-4 can be illustrated as FIG. 20. Therefore, according to the antenna A1 of an aspect of the present disclosure, for example, the orthogonality of radiation patterns of two polarized waves is high. Thus, according to an aspect of the present disclosure, a compact dual-polarized antenna with a split-ring resonator can be provided, for example.

Figure 21:
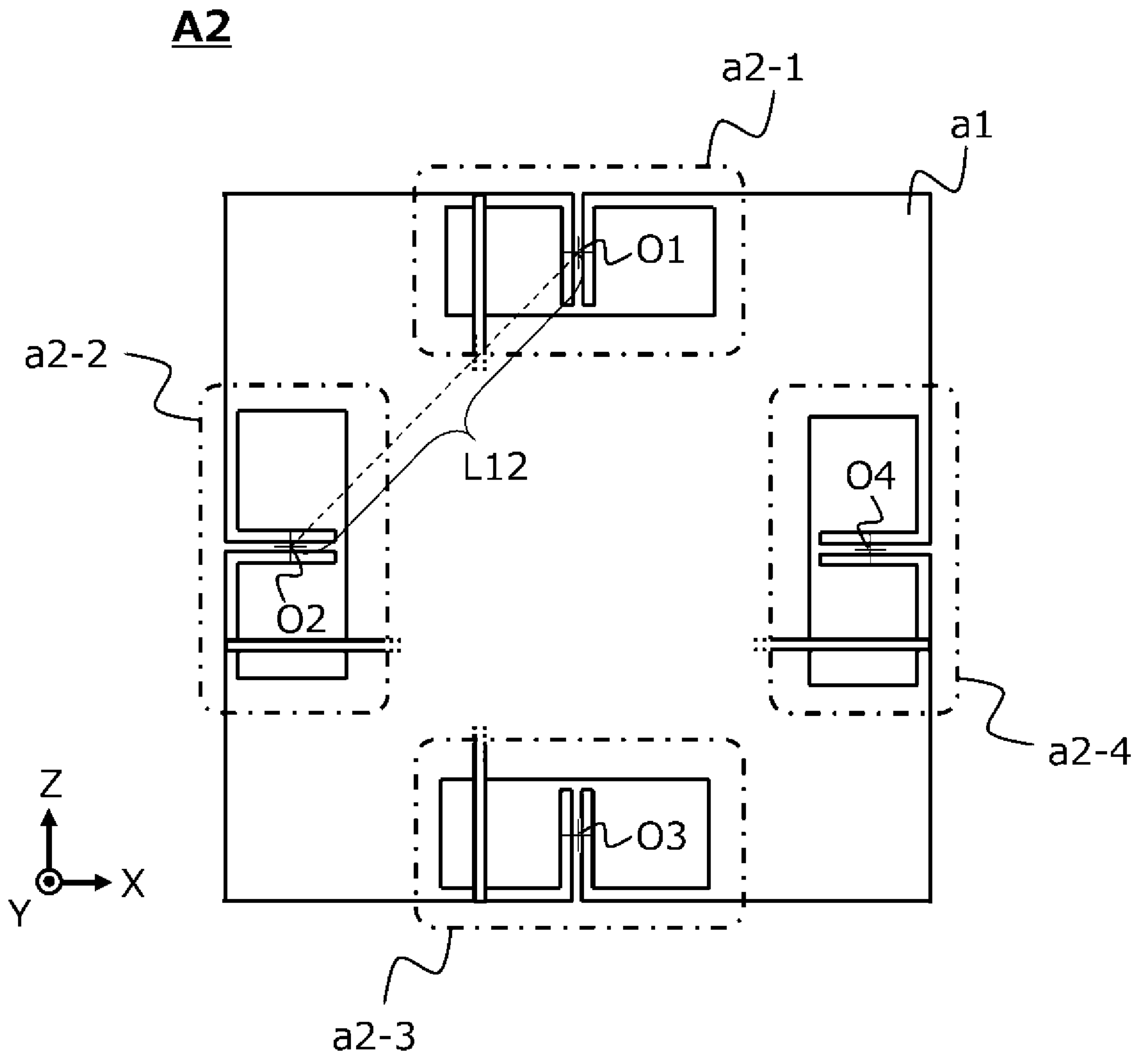
FIG. 21 is an example of an antenna according to an aspect of the present disclosure.

For example, as shown in FIG. 21, an antenna according to an aspect of the present disclosure, for example, the antenna A1 or its modification, may be an antenna A2, wherein a distance L (L12, L23, L34 or L41) between the centers 01, 02, 03 and 04 of two of the antenna elements a2, i.e. (a2-1 and a2-2), (a2-2 and a2-3), (a2-3 and a2-4) or (a2-4 and a2-1), which are among four of the antenna elements a2 and are arranged on any two of the sides of the conductive board a1 adjacent to each other, is about one fifth of or less than vacuum wavelength A of an electromagnetic wave at a resonant frequency of this antenna.

L12 is a length of a line segment which connects the point 01 and the point 02 to each other. Thus, L12 is a distance between the point 01 and the point 02. L23 is a length of a line segment which connects the point 02 and the point 03 to each other. Thus, L23 is a distance between the point 02 and the point 03. L34 is a length of a line segment which connects the point 03 and the point 04 to each other. Thus, L34 is a distance between the point 03 and the point 04. L41 is a length of a line segment which connects the point 04 and the point 01 to each other. Thus, L41 is a distance between the point 04 and the point 01.

For example, according to a dual-polarized antenna in which only adjacent two of the sides of the conductive board a1 of a rectangular shape are provided with the antenna elements a2, for example, only a2-1 and a2-2, when L such as L12 is about one fifth of or less than λ, the orthogonality of radiation patterns of two polarized waves might be low. In contrast, according to the antenna A2 of an aspect of the present disclosure, even when L (L12, L23, L34 or L41) is about one fifth of or less than λ, for example, the orthogonality of radiation patterns of two polarized waves is high. Thus, according to an aspect of the present disclosure, a more compact dual-polarized antenna with a split-ring resonator can be provided, for example.

Figure 22:
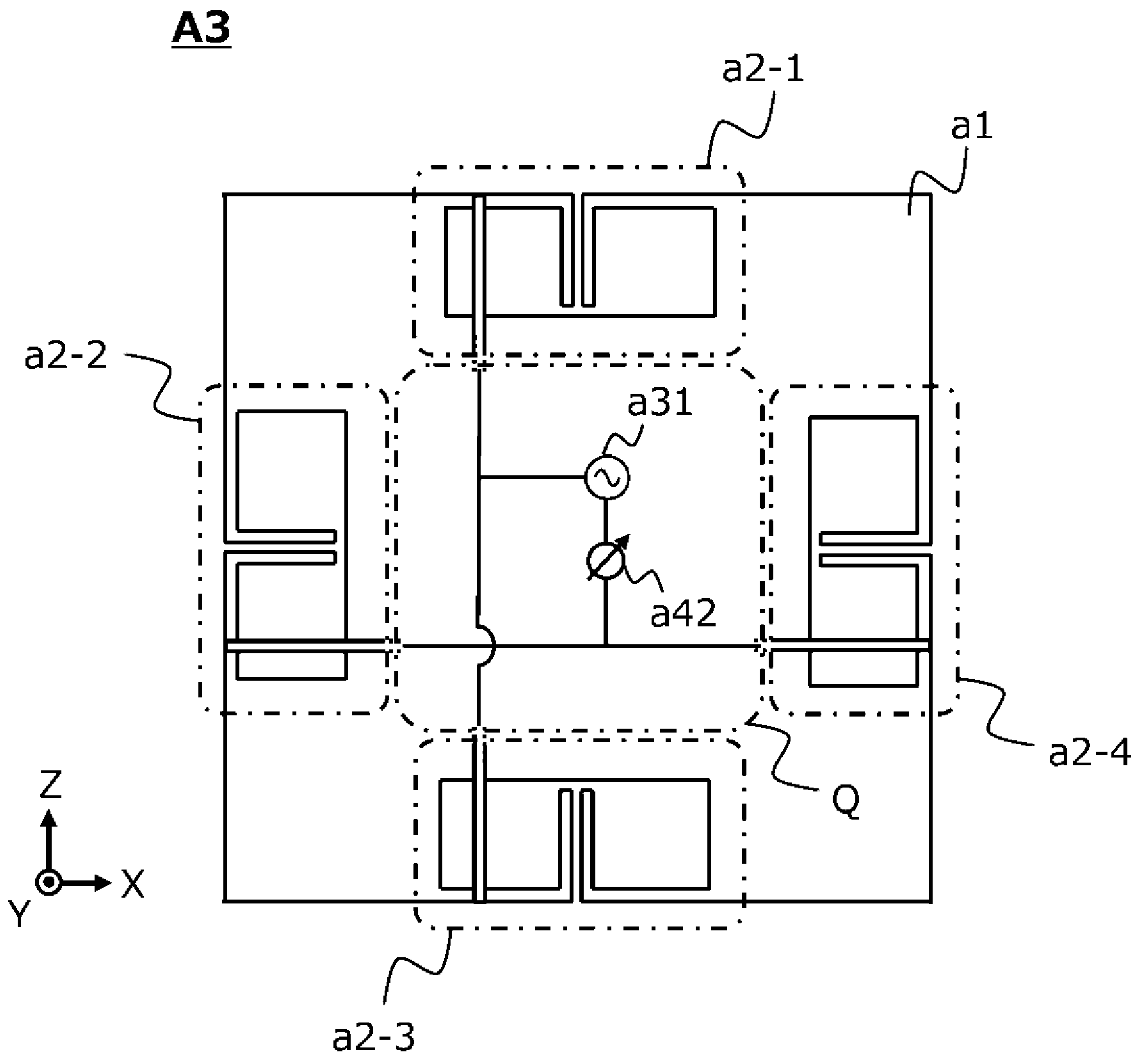
FIG. 22 is an example of a feeding circuit diagram of an antenna according to an aspect of the present disclosure.

For example, as shown in FIG. 22, an antenna according to an aspect of the present disclosure, for example, the antenna A1, A2 or their modification, may be an antenna A3, wherein two of the antenna elements a2, i.e. (a2-1 and a2-2), (a2-2 and a2-3), (a2-3 and a2-4) or (a2-4 and a2-1), which are among four of the antenna elements a2 and are arranged on any two of the sides of the conductive board a1 adjacent to each other, are fed with signals via the feeding wires a23 respectively provided thereto, the signals having a phase difference of 90 degrees.

For example, this phase difference of 90 degrees may be implemented in a configuration such as a circuit diagram Q of FIG. 22 and its modification.

From the above, according to an aspect of the present disclosure, a compact, circularly polarized antenna with a split-ring resonator can be provided, for example.

Figure 23:
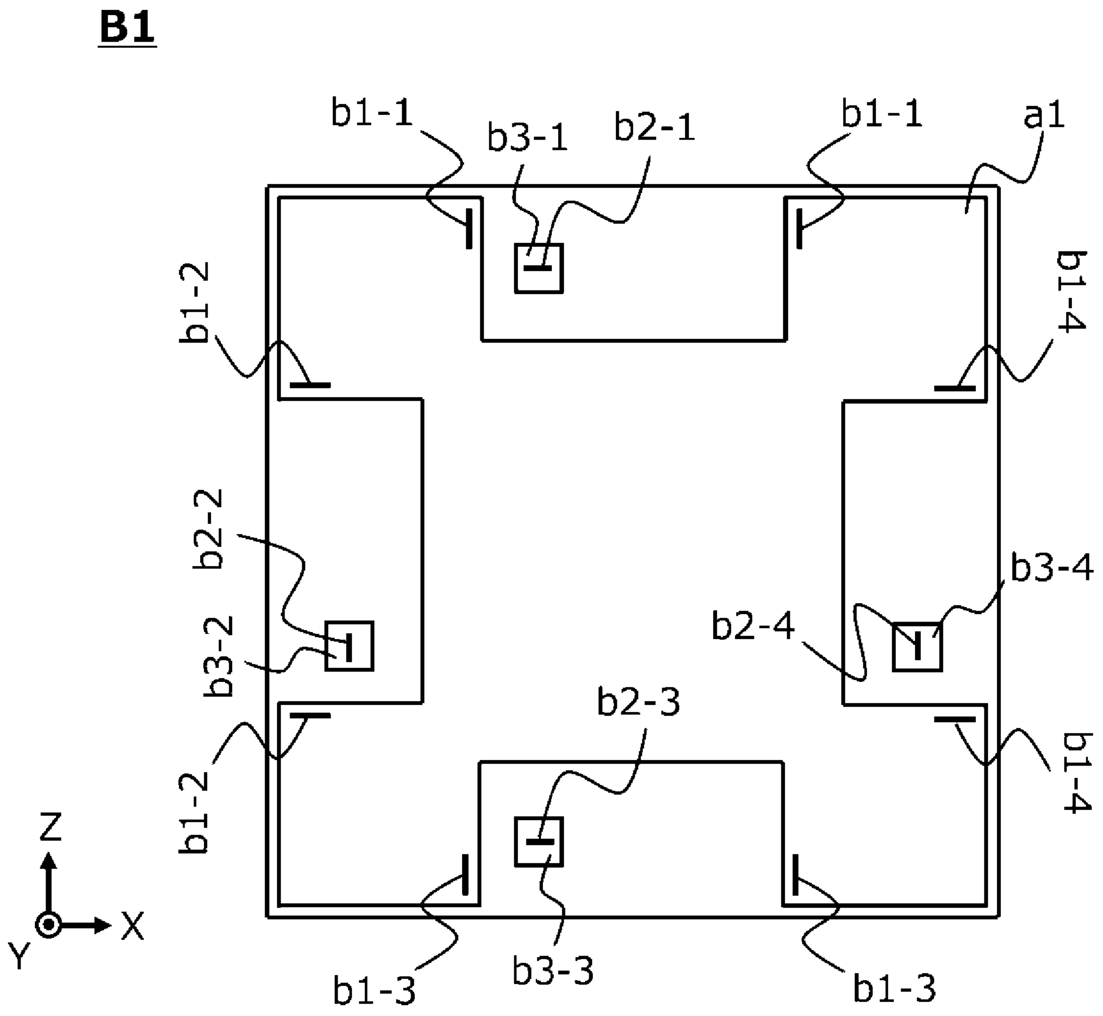
FIG. 23 is an example of a board according to an aspect of the present disclosure.

For example, as shown in FIG. 23, a board according to an aspect of the present disclosure may be the board B1 which comprises the nearly rectangular shaped conductive board a1, comprises terminals b1 (b1-1, b1-2, b1-3 and b1-4) corresponding to ground terminals a25 (a25-1, a25-2, a25-3 and a25-4) of the antenna elements a2 (a2-1, a2-2, a2-3 and a2-4) so that the antenna elements a2 (a2-1, a2-2, a2-3 and a2-4) are attached to sides of the conductive board a1, respectively, and comprises terminals b2 (b2-1, b2-2, b2-3 and b2-4) corresponding to terminals of the feeding wires a23 (a23-1, a23-2, a23-3 and a23-4) so that the antenna elements a2 (a2-1, a2-2, a2-3 and a2-4) are fed via the feeding wires a23 (a23-1, a23-2, a23-3 and a23-4), respectively, in such a manner that orientations of electric fields in polarization directions of the antenna elements a2, i.e. (a2-1 and a2-3) or (a2-2 and a2-4), arranged on any two of the sides of the conductive board a1 opposite to each other are substantially same as each other, wherein: each of the antenna elements a2 comprises the feeding wire a23, the ground terminal a25 separated from the conductive board and the split-ring conductor a22 of a shape which is a ring but is partially cut by the split portion a21; and the feeding wire a23 is electrically connected with the split-ring conductor a22 and extends in a direction which traverses the region a24 formed inside the split-ring conductor a22.

As shown in FIG. 23, the wording of "nearly rectangular shaped" includes a shape in which parts corresponding to mounting positions of the antenna elements a2 are cut out, for example.

For example, the board B1 may comprise another layer as well as a layer provided with the conductive board a1.

For example, the ground terminals a25-1 of the antenna element a2-1 may be one or more. Therefore, the terminals b1-1 of the board B1 which correspond to the ground terminals a25-1 may be correspondingly one or more. Similar implementation can be made about the ground terminals a25-2, a25-3 and a25-4 of the antenna elements a2-2, a2-3 and a2-4 and about the terminals b1-2, b2-3 and b2-4.

Figure 24:
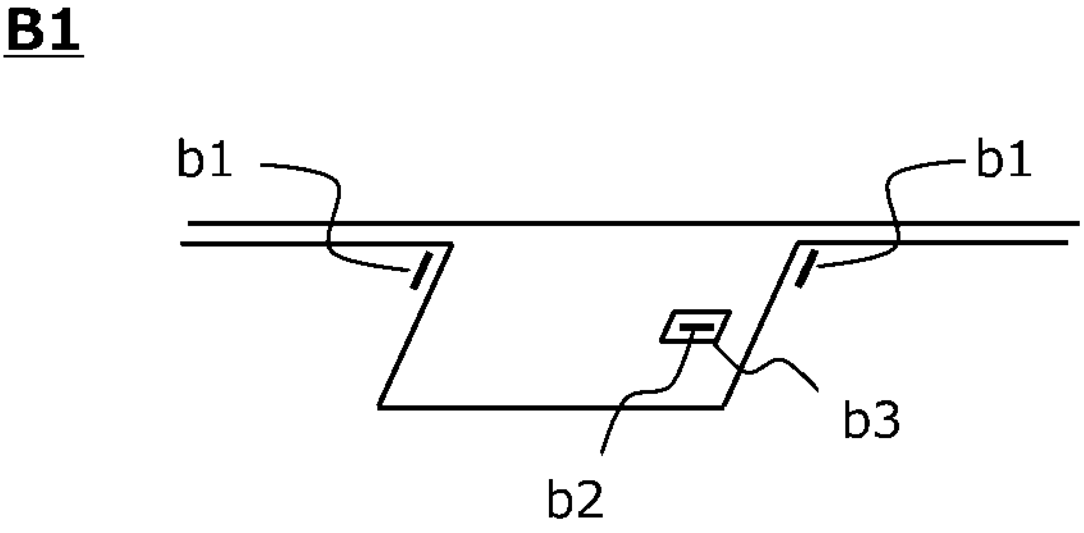
FIG. 24 is an example of a board according to an aspect of the present disclosure.
Figure 25:
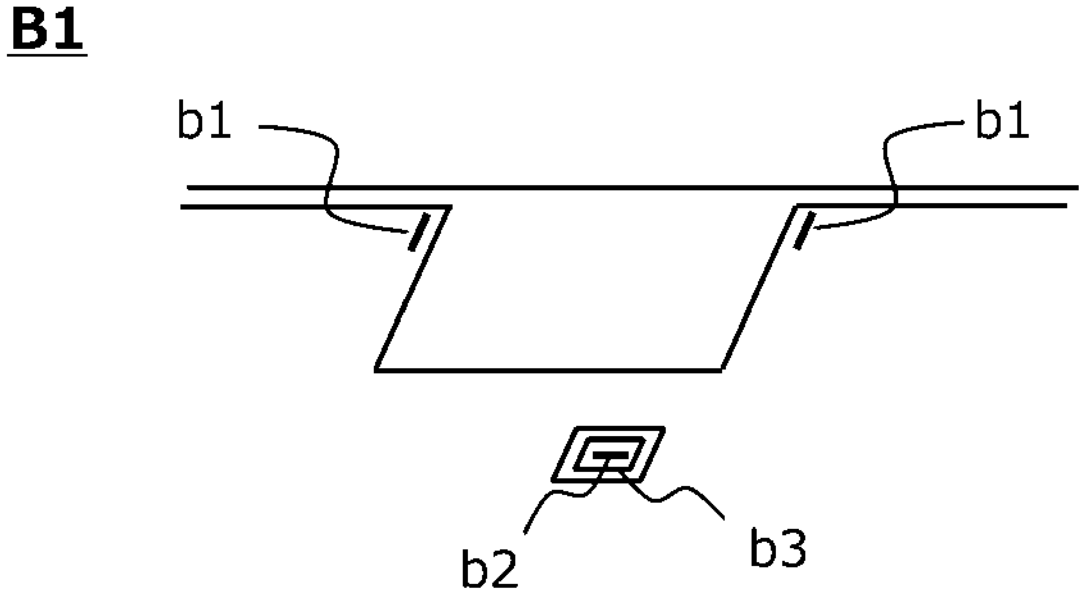
FIG. 25 is an example of a board according to an aspect of the present disclosure.

For example, the board B1 may comprise feeding conductive patterns b3 each including the terminal b2. For example, the feeding conductive patterns b3 may be provided in a layer same as a layer provided with the conductive board a1. For example, as shown in FIG. 24, the feeding conductive pattern b3 may be provided on a part of the board B1 which faces the antenna element a2 (including the region a24) a24 when the antenna element a2 is attached to the board B1. For example, as shown in FIG. 25, the feeding conductive pattern b3 may be provided on a part of the board B1 other than a part which faces the antenna element a2 (including the region a24) when the antenna a2 is attached to the board B1. For example, a configuration such as circuit diagrams of FIGS. 15 to 17 and their modifications may be formed in a layer of the board B1 different from a layer provided with the feeding conductive pattern b3 or may be formed in a layer of the board B1 different from a layer provided with the feeding conductive pattern b3.

Figure 26:
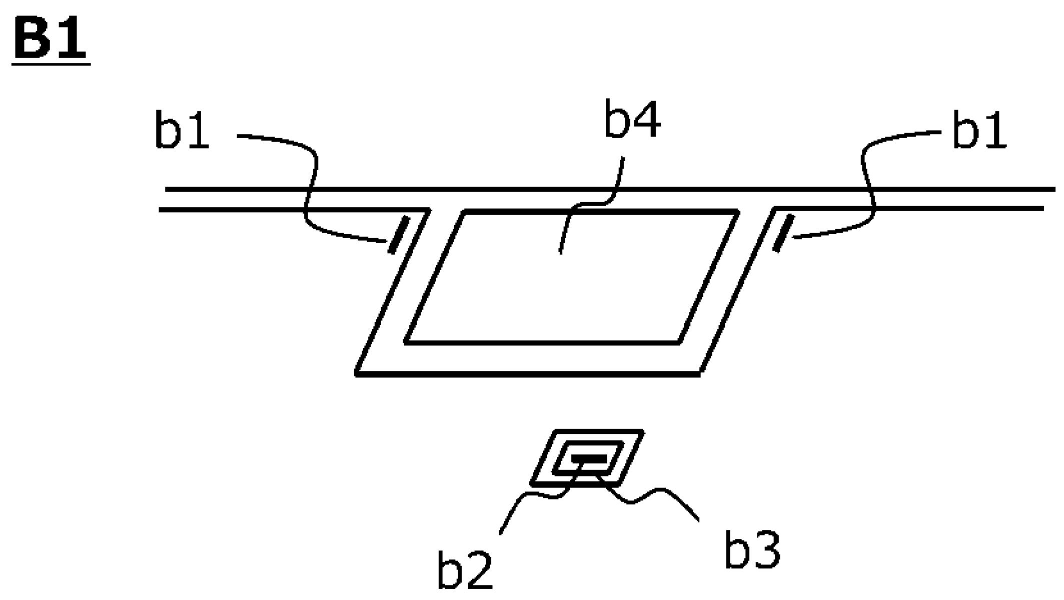
FIG. 26 is an example of a board according to an aspect of the present disclosure.
Figure 27:
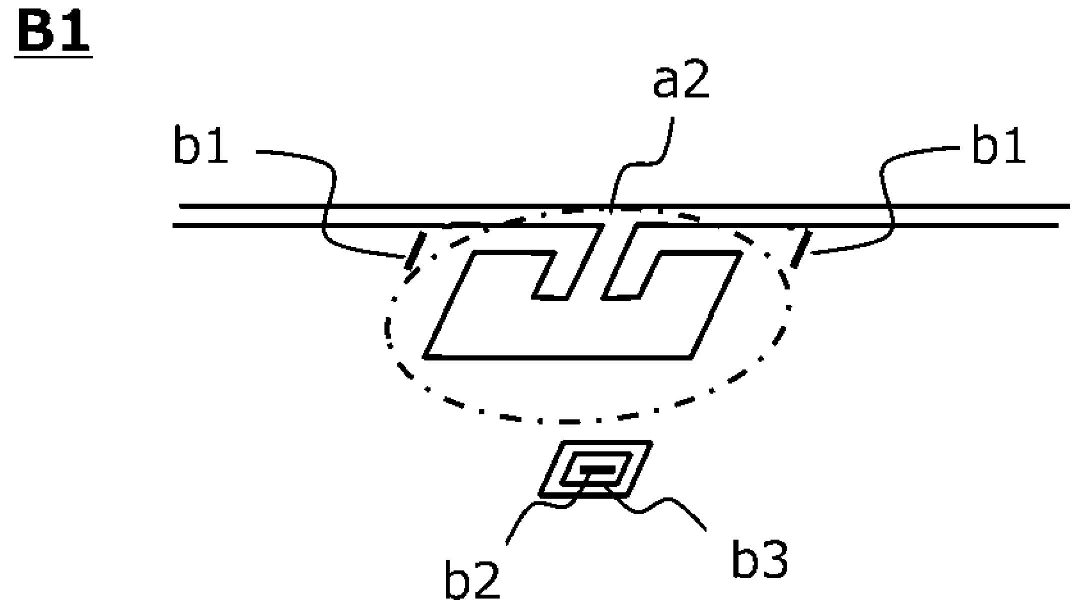
FIG. 27 is an example of a board according to an aspect of the present disclosure.
Figure 28:
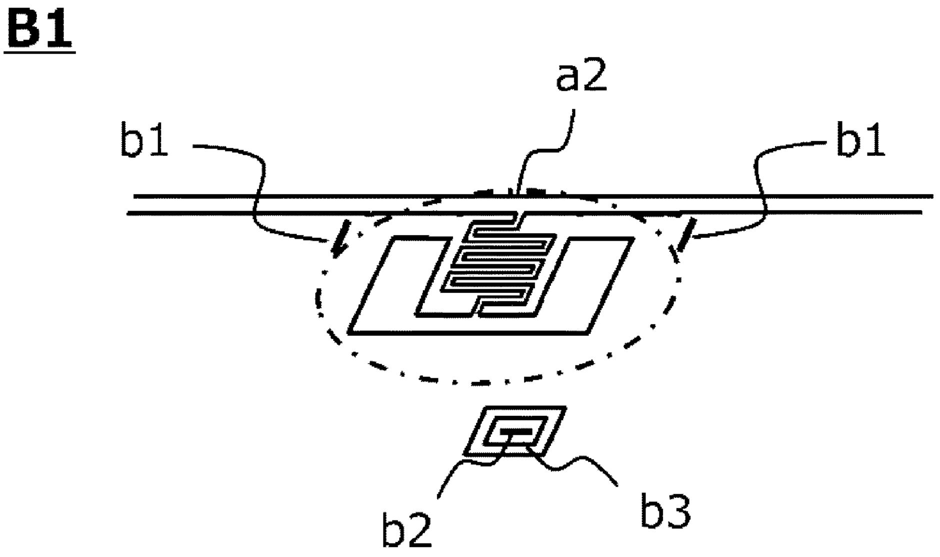
FIG. 28 is an example of a board according to an aspect of the present disclosure.
Figure 29:
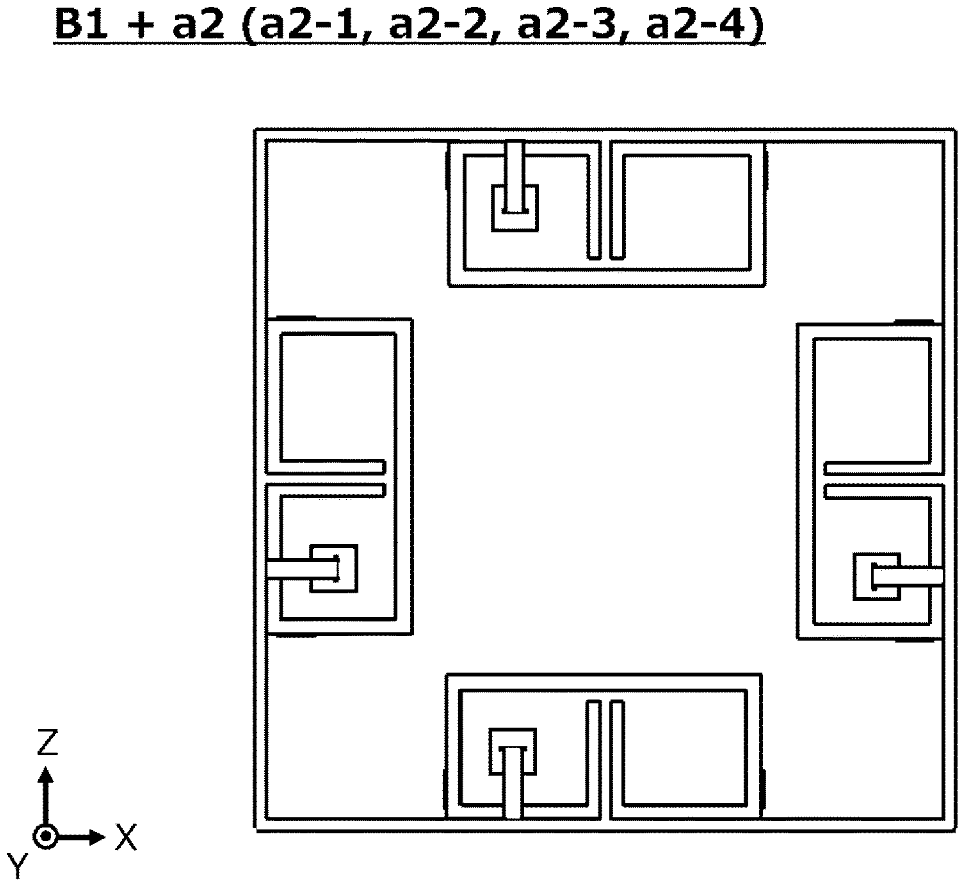
FIG. 29 is an example of a connection configuration between an example of a board according to an aspect of the present disclosure and an example of an antenna element according to an aspect of the present disclosure.
Figure 30:
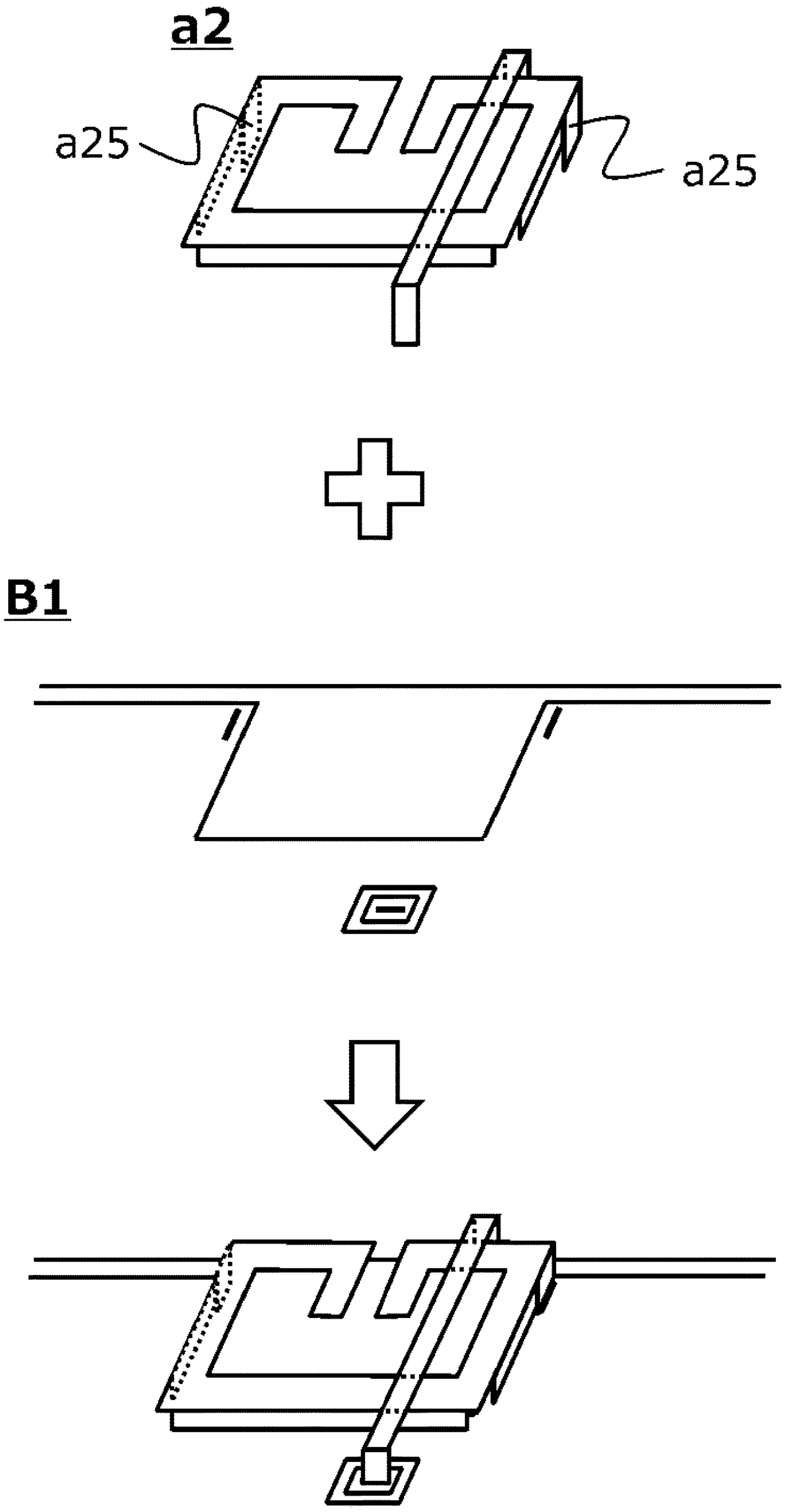
FIG. 30 is an example of a connection configuration between an example of a board according to an aspect of the present disclosure and an example of an antenna element according to an aspect of the present disclosure.
Figure 31:
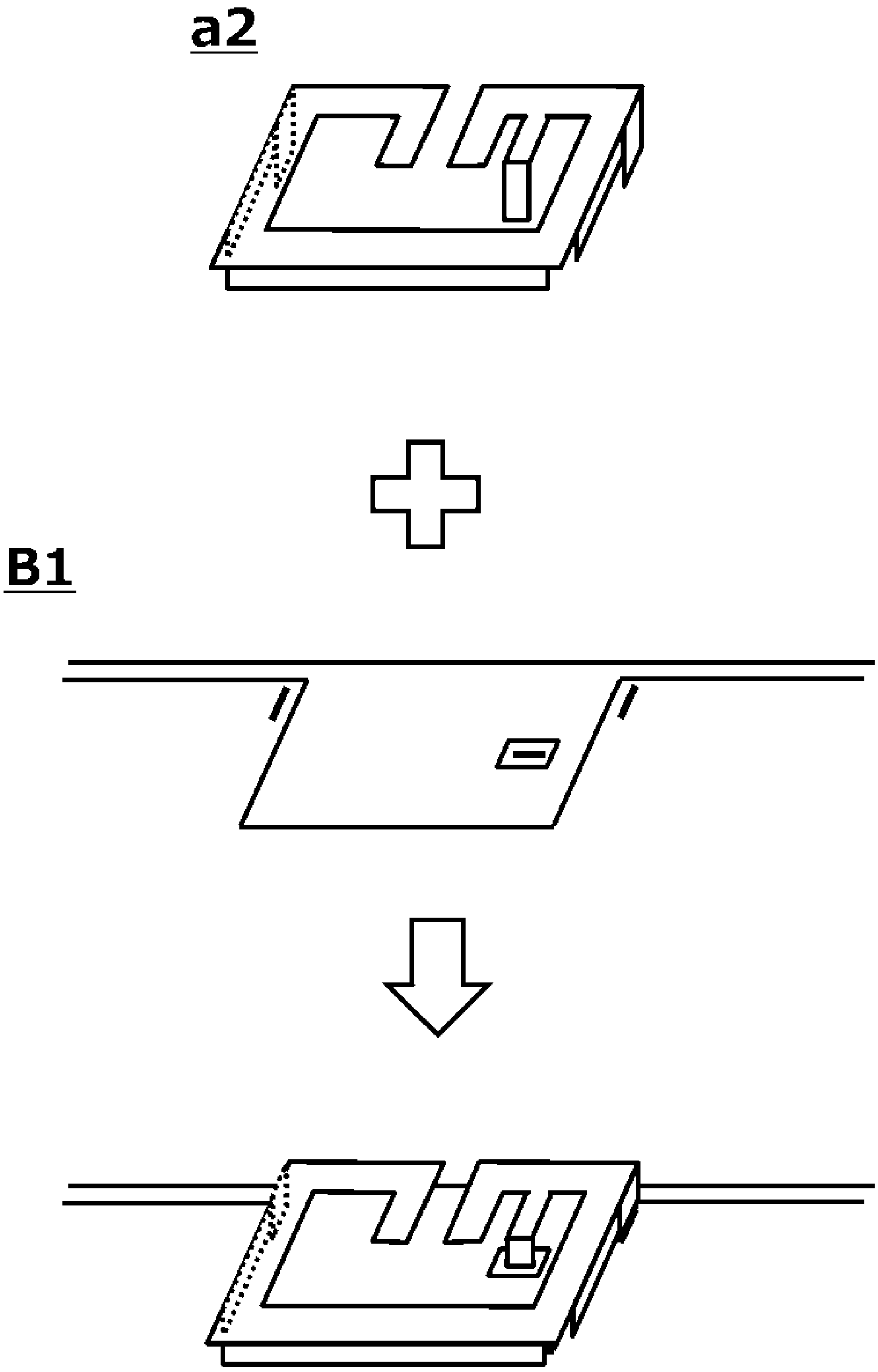
FIG. 31 is an example of a connection configuration between an example of a board according to an aspect of the present disclosure and an example of an antenna element according to an aspect of the present disclosure.
Figure 32:
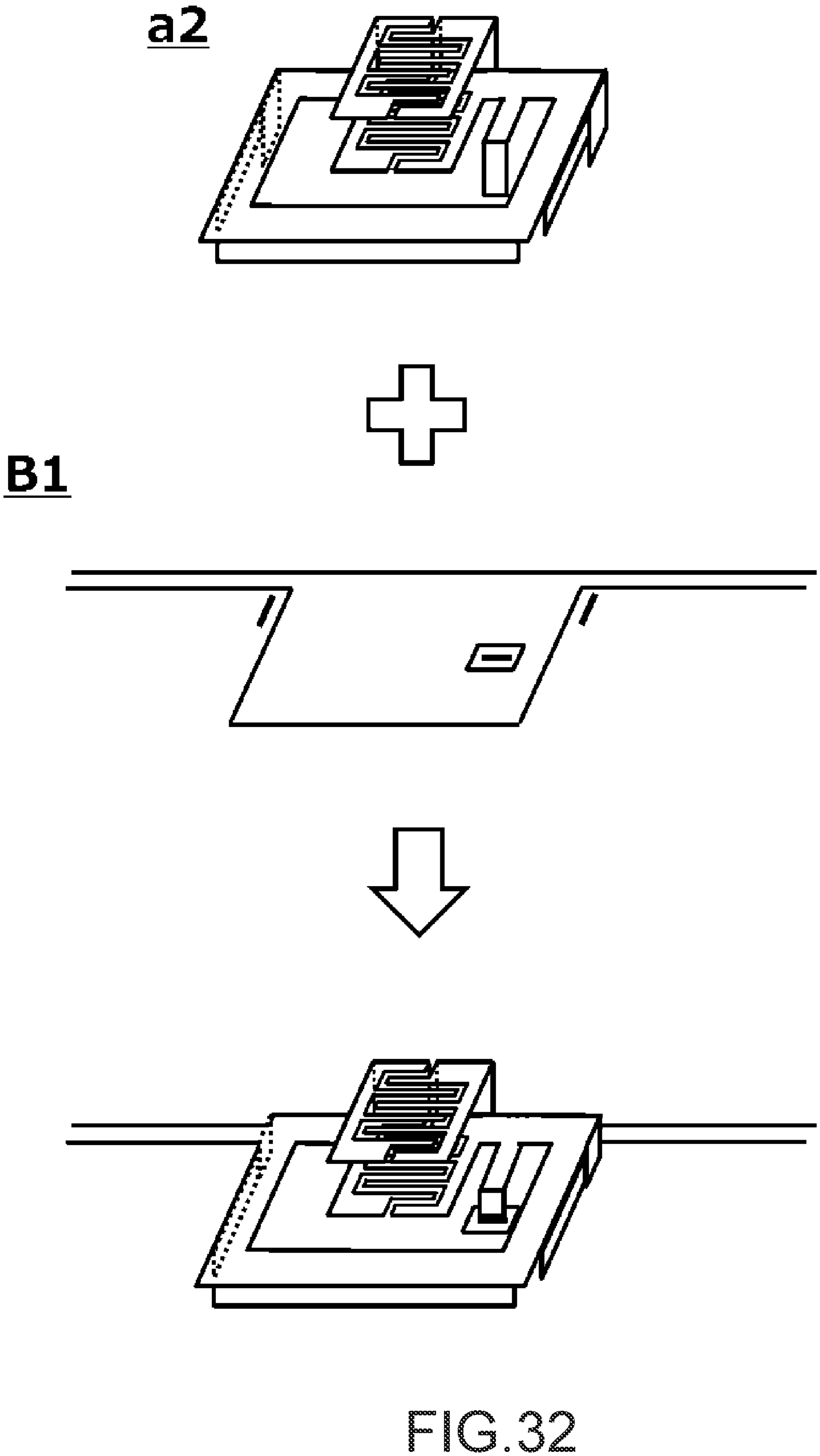
FIG. 32 is an example of a connection configuration between an example of a board according to an aspect of the present disclosure and an example of an antenna element according to an aspect of the present disclosure.
Figure 33:
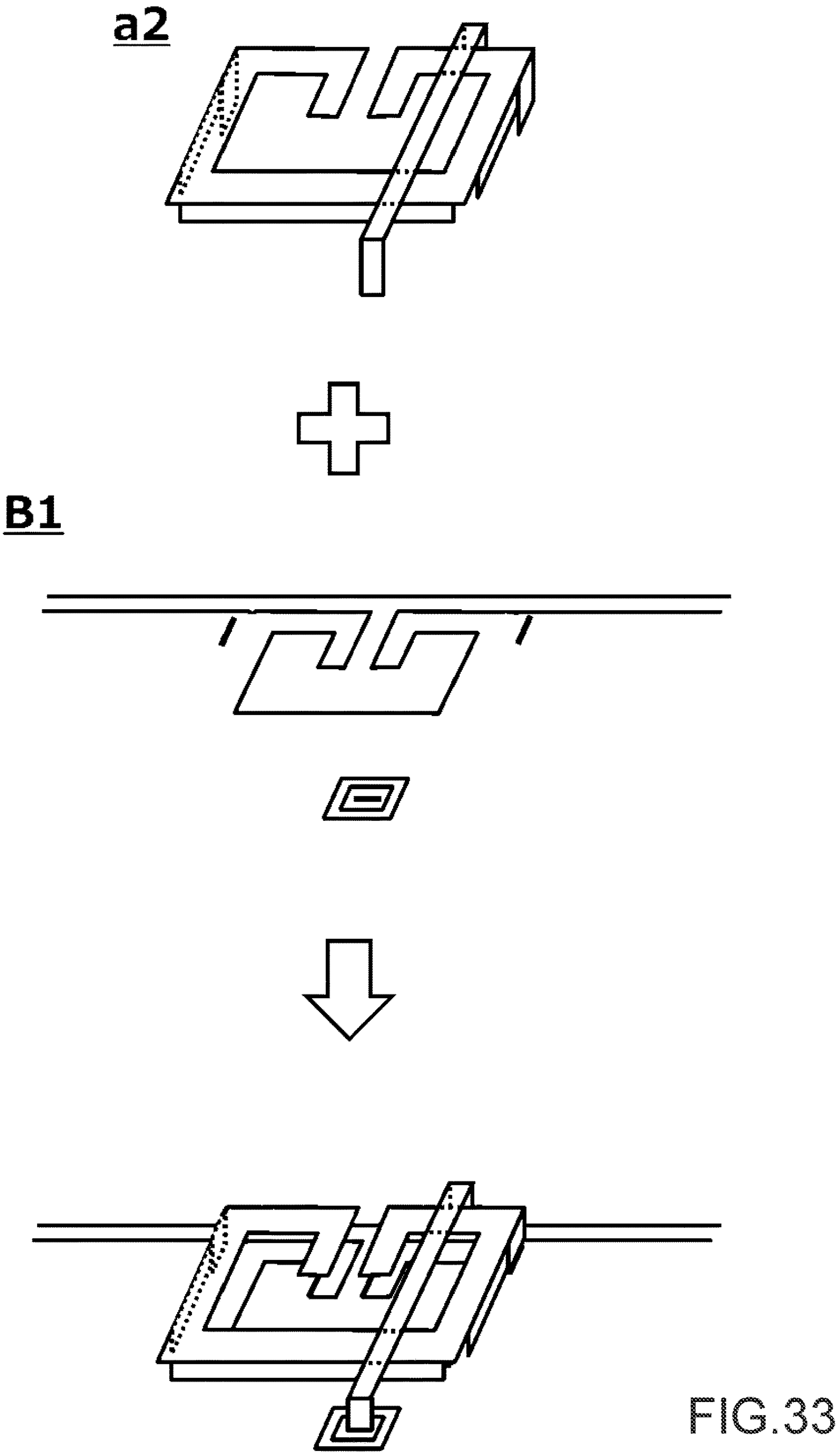
FIG. 33 is an example of a connection configuration between an example of a board according to an aspect of the present disclosure and an example of an antenna element according to an aspect of the present disclosure.
Figure 34:
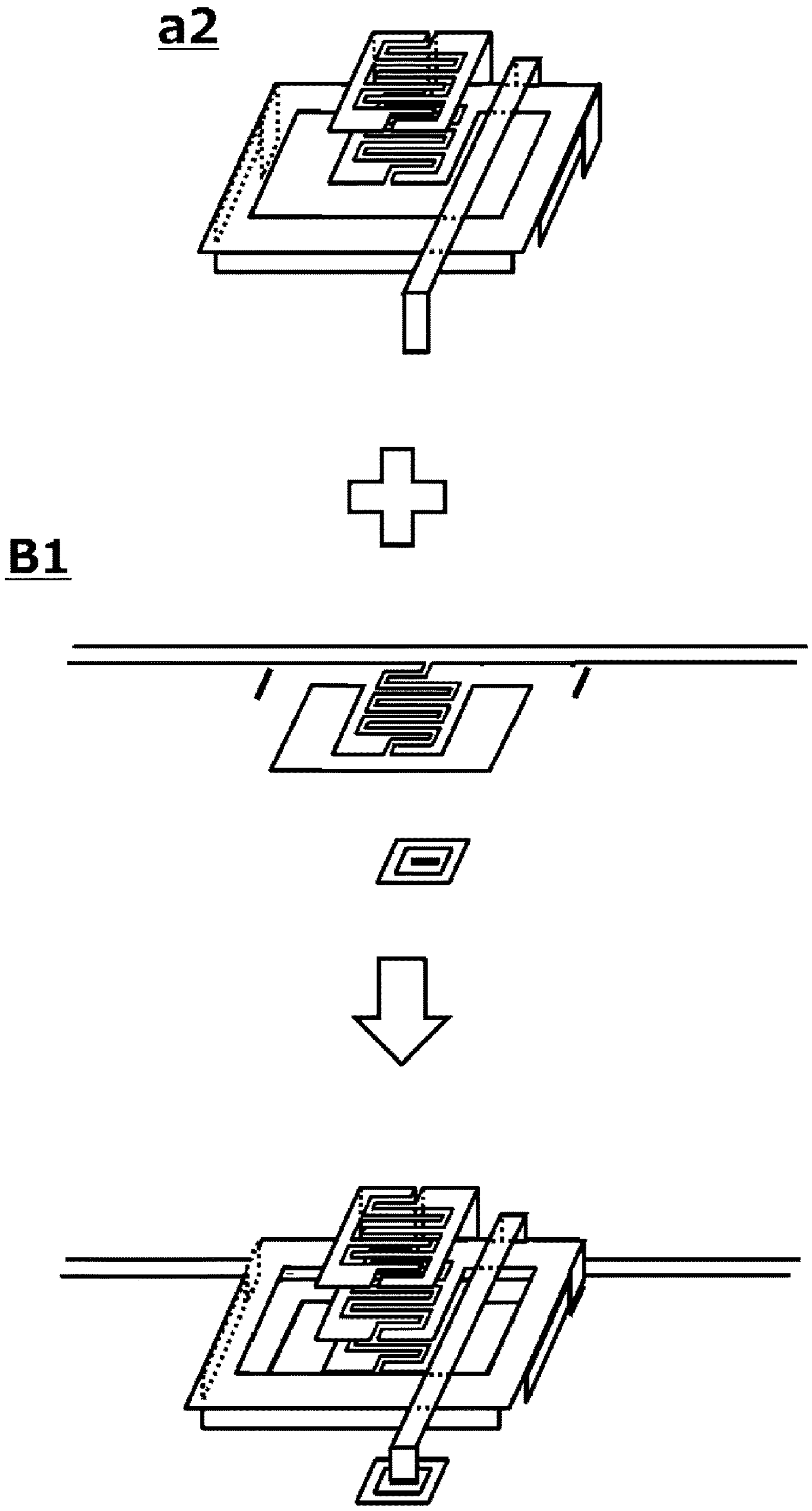
FIG. 34 is an example of a connection configuration between an example of a board according to an aspect of the present disclosure and an example of an antenna element according to an aspect of the present disclosure.
Figure 35:
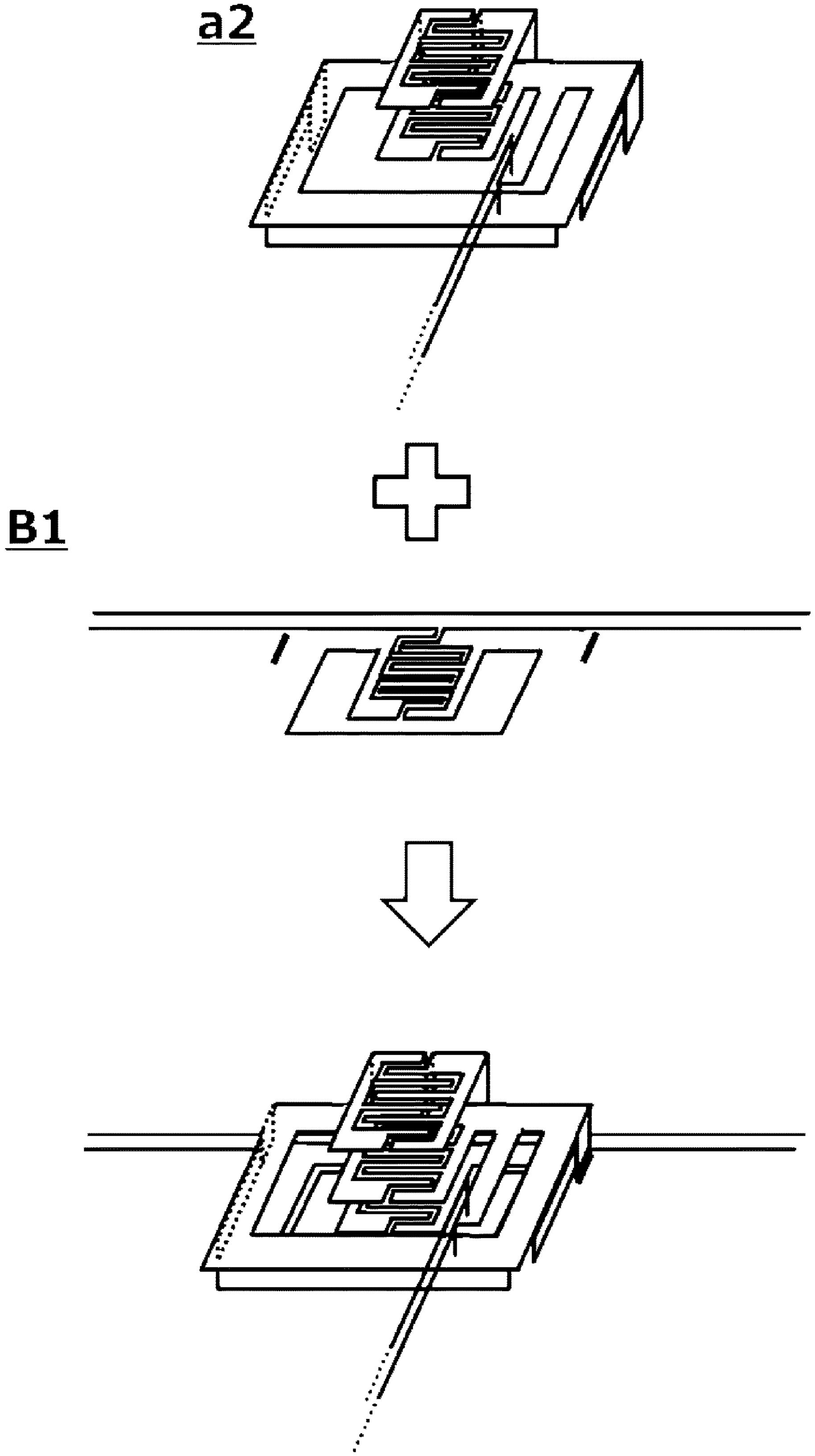
FIG. 35 is an example of a connection configuration between an example of a board according to an aspect of the present disclosure and an example of an antenna element according to an aspect of the present disclosure.

For example, as shown in FIG. 25, no conductor may exist on a part of the board B1 which faces the antenna element a2 (including the region a24) a24 when the antenna elements a2 is attached to the board B1. For example, as shown in FIG. 26, a conductor b4 may exist on a part of the board B1 which faces the antenna element a2 (including the region a24) a24 when the antenna element a2 is attached to the board B1, but the conductor b4 may be electrically disconnected from the conductive board a1. For example, as shown in FIGS. 27 and 28, the antenna element a2 may be provided on a part of the board B1 which faces the antenna element a2 (including the region a24) a24, in advance when the antenna element a2 is attached to the board B1.

From the above, according to an aspect of the present disclosure, current corresponding to fed RF signals can flow through the antenna element a2, for example, by connecting the ground terminals a25 to the terminals b1 and by connecting the terminal of the feeding wire a23 to the corresponding terminal b2 as shown in FIGS. 29 to 35. Therefore, according to an aspect of the present disclosure, for example, the antenna element a2 can be distributed as a single component and can be flexibly combined in accordance with design requirements. Thus, according to an aspect of the present disclosure, for example, the antenna element a2 device can be used as a component. From the above, according to an aspect of the present disclosure, a board for a compact dual-polarized antenna with a split-ring resonator can be provided, for example.

Figure 36:
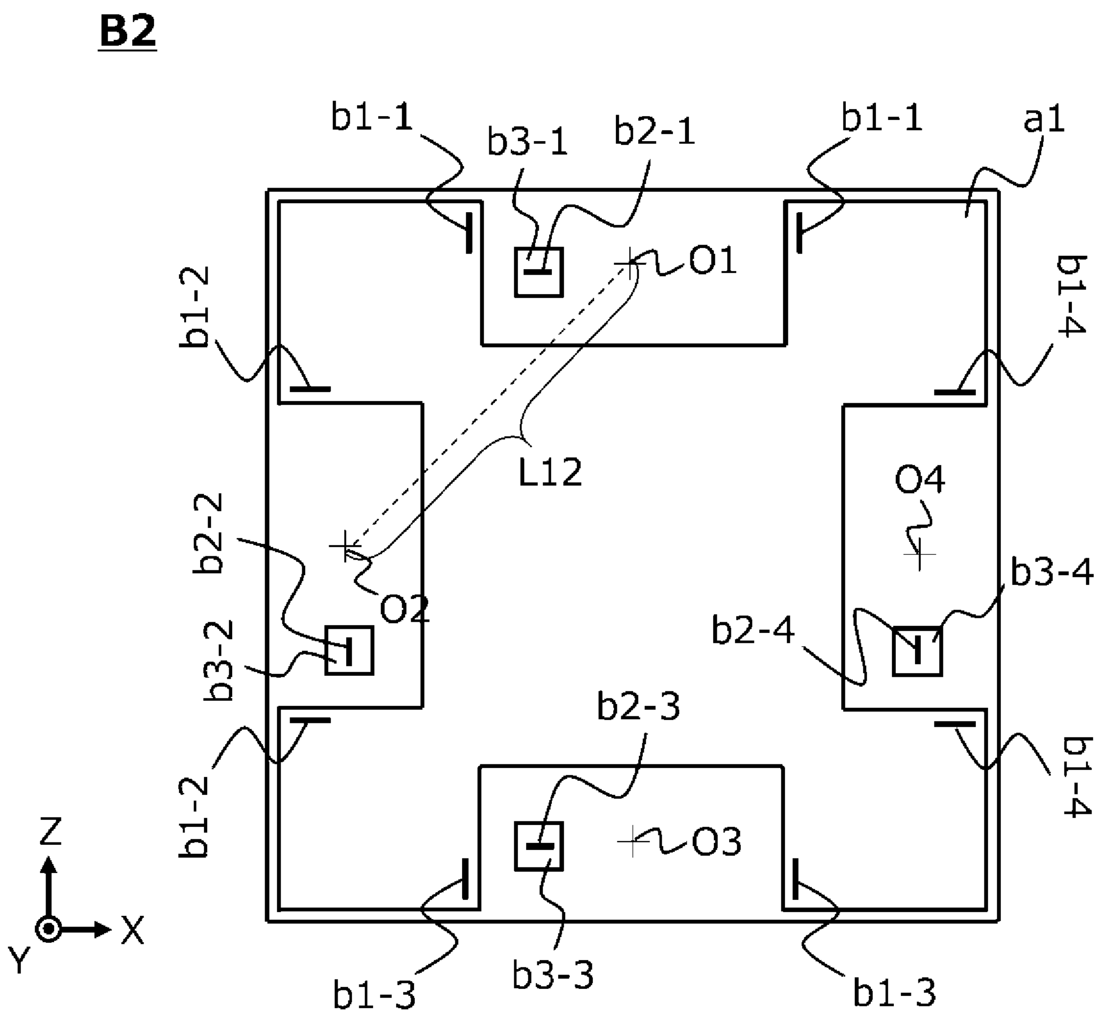
FIG. 36 is an example of a board according to an aspect of the present disclosure.

For example, as shown in FIG. 36, a board according to an aspect of the present disclosure, for example, the board B1 or its modification, may be a board B2 which is configured so that the distance L (L12, L23, L34 or L41) between the centers 01, 02, 03 and 04 of two of the antenna elements a2, i.e. (a2-1 and a2-2), (a2-2 and a2-3), (a2-3 and a2-4) or (a2-4 and a2-1), which are arranged on any two of the sides of the conductive board a1 adjacent to each other when the antenna elements a2 (a2-1, a2-2, a2-3 and a2-4) are attached to the respective sides of the conductive board a1, is one fifth of or less than vacuum wavelength of an electromagnetic wave at a resonant frequency of the antenna.

From the above, according to an aspect of the present disclosure, a board for a more compact dual-polarized antenna with a split-ring resonator can be provided, for example.

For example, a board according to an aspect of the present disclosure, for example, the board B1, B2 or their modification, may be a board B3 which is configured so that two of the antenna elements a2, i.e. (a2-1 and a2-2), (a2-2 and a2-3), (a2-3 and a2-4) or (a2-4 and a2-1), which are arranged on any two of the sides of the conductive board a1 adjacent to each other when the antenna elements a2 (a2-1, a2-2, a2-3 and a2-4) are attached to the respective sides of the conductive board a1, are respectively fed with signals having a phase difference of 90 degrees.

For example, this phase difference of 90 degrees may be implemented in a configuration such as the circuit diagram Q of FIG. 22 and its modification. For example, a configuration such as the circuit diagram Q of FIG. 22 and its modification may be formed in a layer of the board B1 different from a layer provided with the feeding conductive pattern b3 or may be formed in a layer of the board B1 different from a layer provided with the feeding conductive pattern b3.

From the above, according to an aspect of the present disclosure, a board for a compact, circularly polarized antenna with a split-ring resonator can be provided, for example.

For example, a communication device according to an aspect of the present disclosure may comprise an antenna according to an aspect of the present disclosure, for example, the antenna A1, A2 or A3 or their modification.

From the above, according to an aspect of the present disclosure, a communication device comprising a compact dual-polarized antenna with a split-ring resonator can be provided, for example.

Although the present invention has been described above with reference to the embodiments, the present invention is not limited by the description described above. Various modifications, which can be understood by a skilled person in the art within the scope of the invention, can be applied to the configuration and details of the present invention.

The present application is based on and claims priority to a Japanese patent application of JP2018-243860 filed on Dec. 27, 2018 before the Japan Patent Office, the content of which is entirely incorporated herein.

REFERENCE SIGNS LIST

A1, A2, A3: antenna
a1: conductive board
a2 (a2-1, a2-2, a2-3, a2-4): antenna element
a21 (a21-1, a21-2, a21-3, a21-4): split portion
a22 (a22-1, a22-2, a22-3, a22-4): split-ring conductor
a23 (a23-1, a23-2, a23-3, a23-4): feeding wire
a24 (a24-1, a24-2, a24-3, a24-4): region
a25 (a25-1, a25-2, a25-3, a25-4): ground terminal
a31, a32: feeding point
a41, a42: phase shifter
B1, B2, B3: board
b1 (b1-1, b1-2, b1-3, b1-4): terminal
b2 (b2-1, b2-2, b2-3, b2-4): terminal
b3 (b3-1, b3-2, b3-3, b3-4): feeding conductive pattern
b4 (b4-1, b4-2, b4-3, b4-4): conductor

The invention claimed is:

1. An antenna comprising antenna elements provided on sides of a nearly rectangular shaped conductive board, respectively, wherein:

each of the antenna elements comprises a feeding wire and a split-ring conductor of a shape which is a ring but is partially cut by a split portion;

the feeding wire is electrically connected with the split-ring conductor and extends in a direction which traverses a region formed inside the split-ring conductor; and among four of the antenna elements, two of the antenna elements which are arranged on any two of the sides of the conductive board opposite to each other are fed via the feeding wires respectively provided thereto so that orientations of electric fields in polarization directions thereof are substantially same as each other.

2. The antenna as recited in claim 1, wherein a distance between the centers of two of the antenna elements, which are among four of the antenna elements and are arranged on any two of the sides of the conductive board adjacent to each other, is about one fifth of or less than vacuum wavelength of an electromagnetic wave at a resonant frequency of the antenna.

3. The antenna as recited in claim 1, wherein two of the antenna elements, which are among four of the antenna elements and are arranged on any two of the sides of the conductive board adjacent to each other, are fed with signals via the feeding wires respectively provided thereto, the signals having a phase difference of 90 degrees.

4. A board comprising:

a nearly rectangular shaped conductive board;

terminals corresponding to ground terminals of antenna elements so that the antenna elements are attached to sides of the conductive board, respectively; and terminals corresponding to terminals of feeding wires so that the antenna elements are fed via the feeding wires, respectively, in such a manner that orientations of electric fields in polarization directions of the antenna elements arranged on any two of the sides of the conductive board opposite to each other are substantially same as each other, wherein:

each of the antenna elements comprises the feeding wire, the ground terminal separated from the conductive board and a split-ring conductor of a shape which is a ring but is partially cut by a split portion; and the feeding wire is electrically connected with the split-ring conductor and extends in a direction which traverses a region formed inside the split-ring conductor.

5. The board as recited in claim 4, wherein the board is configured so that a distance between the centers of two of the antenna elements, which are arranged on any two of the sides of the conductive board adjacent to each other when the antenna elements are attached to the respective sides of the conductive board, is one fifth of or less than vacuum wavelength of an electromagnetic wave at a resonant frequency of the antenna element.

6. The board as recited in claim 4, wherein the board is configured so that two of the antenna elements, which are arranged on any two of the sides of the conductive board adjacent to each other when the antenna elements are attached to the respective sides of the conductive board, are respectively fed with signals having a phase difference of 90 degrees.

7. A communication device comprising the antenna as recited in claim 1.

* * * * *